(12) United States Patent
Sugano et al.

(10) Patent No.: US 9,415,774 B2
(45) Date of Patent: Aug. 16, 2016

(54) VEHICLE CONTROL APPARATUS INCLUDING AN OBSTACLE DETECTION DEVICE

(71) Applicants: Takeshi Sugano, Kawasaki (JP); Masahiro Kobayashi, Isehara (JP); Toshimichi Gokan, Machida (JP)

(72) Inventors: Takeshi Sugano, Kawasaki (JP); Masahiro Kobayashi, Isehara (JP); Toshimichi Gokan, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/237,406

(22) PCT Filed: Sep. 19, 2012

(86) PCT No.: PCT/JP2012/073922
§ 371 (c)(1),
(2) Date: Feb. 6, 2014

(87) PCT Pub. No.: WO2013/042686
PCT Pub. Date: Mar. 28, 2013

(65) Prior Publication Data
US 2014/0200799 A1    Jul. 17, 2014

(30) Foreign Application Priority Data

Sep. 22, 2011   (JP) .................................. 2011-206845

(51) Int. Cl.
*G08G 1/16* (2006.01)
*B62D 15/02* (2006.01)
(Continued)

(52) U.S. Cl.
CPC ............. *B60W 30/08* (2013.01); *B60Q 9/006* (2013.01); *B60W 30/0956* (2013.01); *B60W 30/18009* (2013.01); *B60W 30/18027* (2013.01); *B62D 15/027* (2013.01); *G01S 15/931* (2013.01); *G08G 1/168* (2013.01);
(Continued)

(58) Field of Classification Search
None
See application file for complete search history.

(56) References Cited

U.S. PATENT DOCUMENTS 5,777,563 A * 7/1998 Minissale et al. ............. 340/903
8,600,657 B2   12/2013 Saito et al.
(Continued)

FOREIGN PATENT DOCUMENTS

CN   101226238 A   7/2008
JP   11-301383 A   11/1999
(Continued)

OTHER PUBLICATIONS

The Extended European Search Report for the corresponding European patent application No. 12833760.7 issued on Apr. 10, 2015.

*Primary Examiner* — Rami Khatib
*Assistant Examiner* — Jeffrey Boomer
(74) *Attorney, Agent, or Firm* — Global IP Counselors, LLP

(57) ABSTRACT

A vehicle control device basically includes a first risk computation unit, a second risk computing unit and a first risk adjustment unit. The first risk computation unit calculates a first risk with respect to a nearby obstacle located in a nearby detection region near a host vehicle. The second risk computing unit calculates a second risk with respect to a remote obstacle located further from the nearby detection region. The first risk adjustment unit adjusts at least one of the first and the second risks to preferentially execute a warning or vehicle control based on one of the first risk or the second risk versus a warning or vehicle control based on the other of the first risk or the second risk based on an entry state of the host vehicle of entering a planned parking place, or an exit state of the host vehicle of exiting from a parking place.

11 Claims, 28 Drawing Sheets

(51) Int. Cl.
  *B60Q 9/00* (2006.01)
  *G01S 15/93* (2006.01)
  *B60W 30/00* (2006.01)
  *B60W 30/08* (2012.01)
  *B60W 30/095* (2012.01)
  *B60W 30/18* (2012.01)
  *G01S 13/93* (2006.01)

(52) U.S. Cl.
  CPC .. *G01S 2013/935* (2013.01); *G01S 2013/9346* (2013.01); *G01S 2013/9353* (2013.01); *G01S 2015/932* (2013.01); *G01S 2015/938* (2013.01); *G08G 1/166* (2013.01)

(56) References Cited

U.S. PATENT DOCUMENTS

| | | | | |
|---|---|---|---|---|
| 2007/0063874 | A1* | 3/2007 | Danz | B60Q 9/006 340/932.2 |
| 2007/0146164 | A1* | 6/2007 | Schmid | G08G 1/161 340/932.2 |
| 2007/0273490 | A1* | 11/2007 | Fuchs et al. | 340/435 |
| 2007/0279199 | A1* | 12/2007 | Danz et al. | 340/435 |
| 2008/0088499 | A1* | 4/2008 | Bonthron et al. | 342/104 |
| 2008/0097700 | A1* | 4/2008 | Grimm | G08G 1/166 701/301 |
| 2008/0211644 | A1 | 9/2008 | Buckley et al. | |
| 2008/0306666 | A1 | 12/2008 | Zeng et al. | |
| 2009/0045928 | A1* | 2/2009 | Rao et al. | 340/435 |
| 2009/0079553 | A1* | 3/2009 | Yanagi et al. | 340/435 |
| 2009/0309970 | A1* | 12/2009 | Ishii | B60R 1/00 348/143 |
| 2009/0322501 | A1* | 12/2009 | Haberland | B60Q 9/006 340/435 |
| 2010/0156671 | A1* | 6/2010 | Lee | B62D 15/027 340/932.2 |
| 2010/0253541 | A1* | 10/2010 | Seder | G01S 13/723 340/905 |
| 2010/0283633 | A1* | 11/2010 | Becker | B60R 1/00 340/932.2 |
| 2011/0043380 | A1 | 2/2011 | Bammert et al. | |
| 2011/0054739 | A1* | 3/2011 | Bammert et al. | 701/41 |
| 2011/0205088 | A1* | 8/2011 | Baker | 340/932.2 |
| 2011/0251755 | A1* | 10/2011 | Widmann | 701/36 |
| 2012/0025964 | A1* | 2/2012 | Beggs et al. | 340/435 |
| 2012/0090395 | A1* | 4/2012 | Lavoie | G01S 7/52006 73/620 |
| 2012/0143456 | A1* | 6/2012 | Ueda | B60W 10/08 701/93 |
| 2012/0253549 | A1* | 10/2012 | Cund | G01S 7/4026 701/1 |
| 2012/0323479 | A1* | 12/2012 | Nagata | B60Q 9/008 701/301 |
| 2012/0330541 | A1* | 12/2012 | Sakugawa | G08G 1/166 701/301 |
| 2013/0024103 | A1* | 1/2013 | Schneider | B60W 40/04 701/301 |
| 2013/0297173 | A1* | 11/2013 | Takagi et al. | 701/70 |
| 2014/0121930 | A1* | 5/2014 | Allexi | B60W 50/10 701/70 |
| 2014/0240114 | A1* | 8/2014 | Waeller | B60Q 9/008 340/435 |
| 2015/0203112 | A1* | 7/2015 | Duncan | B60W 30/095 701/1 |
| 2015/0203113 | A1* | 7/2015 | Duncan | B60W 30/0953 701/1 |
| 2015/0266509 | A1* | 9/2015 | Ignaczak | B62D 15/027 701/1 |

FOREIGN PATENT DOCUMENTS

| | | |
|---|---|---|
| JP | 2006-335239 A | 12/2006 |
| JP | 2007-022280 A | 2/2007 |
| JP | 2008-006922 A | 1/2008 |
| JP | 2010-000969 A | 1/2010 |
| WO | 2010/032556 A1 | 3/2010 |

* cited by examiner

VEHICLE CONTROL APPARATUS INCLUDING AN OBSTACLE DETECTION DEVICE

CROSS-REFERENCE TO RELATED APPLICATIONS

This application is a U.S. National stage application of International Application No. PCT/JP2012/073922, filed Sep. 19, 2012, which claims priority under to Japanese Patent Application No. 2011-206845 filed in Japan on Sep. 22, 2011.

BACKGROUND

1. Field of the Invention

The present invention relates to a vehicle control device that produces a warning or carries out vehicle control regarding an obstacle.

2. Background Information Background Art

There is known an on-board obstacle sensing system that detects obstacles using an electromagnetic wave sensor and an ultrasonic sensor (refer to, for example, Japanese Unexamined Patent Publication No. H11-301383).

SUMMARY

However, since an alarm buzzer will certainly sound when each of the sensors detect an obstacle, the above mentioned on-board obstacle sensing system may execute a warning for obstacles that have little possibility of contacting a vehicle, and has the disadvantage of putting unneeded stress on the driver.

The present invention aims to address the problem of providing a vehicle control device capable of reducing the amount of stress put on the driver.

The present invention addresses the above mentioned problem by calculating a first risk representing the possibility that a first obstacle at a nearby location will contact a vehicle, and calculating a second risk representing the possibility that a second obstacle at a remote location will contact the vehicle, and adjusting at least one of the first risk and the second risk to preferentially execute a warning or vehicle control based on one of the first risk or the second risk based on the other of the first risk or the second risk.

According to the present invention, adjusting at least one of the first risk and the second risk, and preferentially executing a warning or vehicle control regarding an obstacle that has a high possibility of contacting the vehicle based on the parking state of the vehicle thereby makes it possible to reduce the stress put on the driver.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below based on the drawings.

First Embodiment

Figure 1:
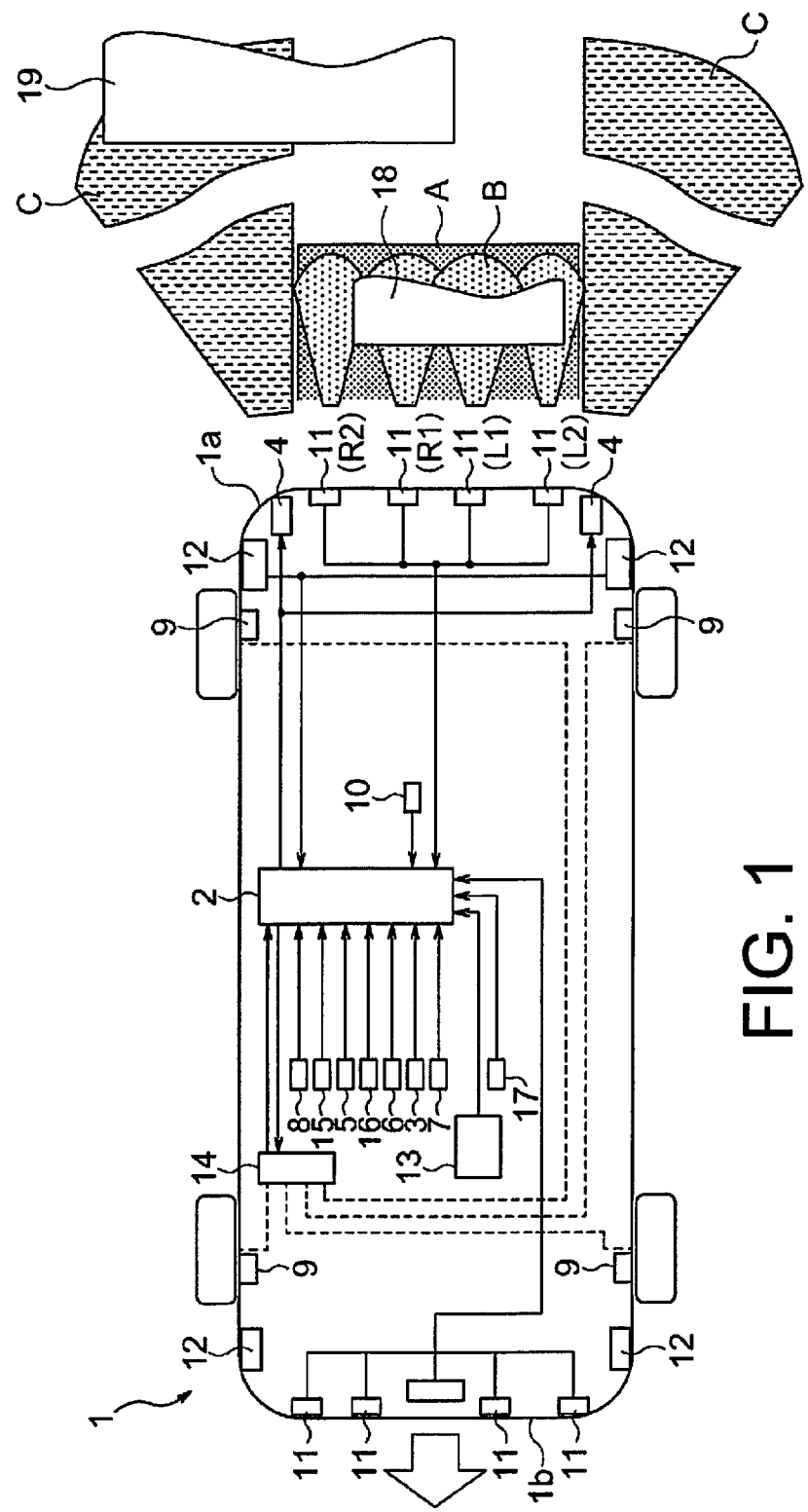
FIG. 1 is a schematic view of a vehicle according to a first embodiment of the present invention.
Figure 2:
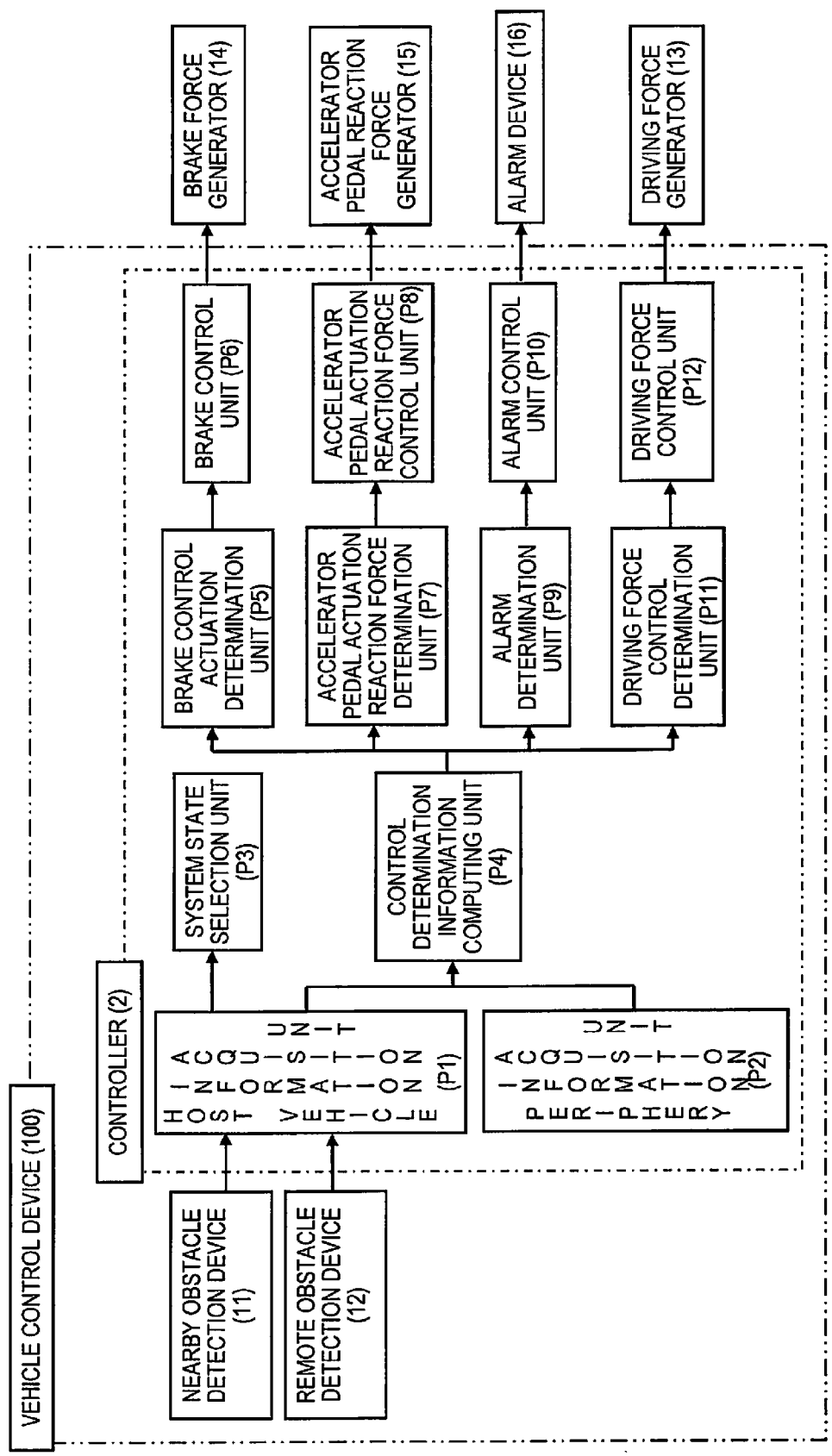
FIG. 2 is a block diagram of the vehicle control device according to the first embodiment of the present invention.
Figure 3:
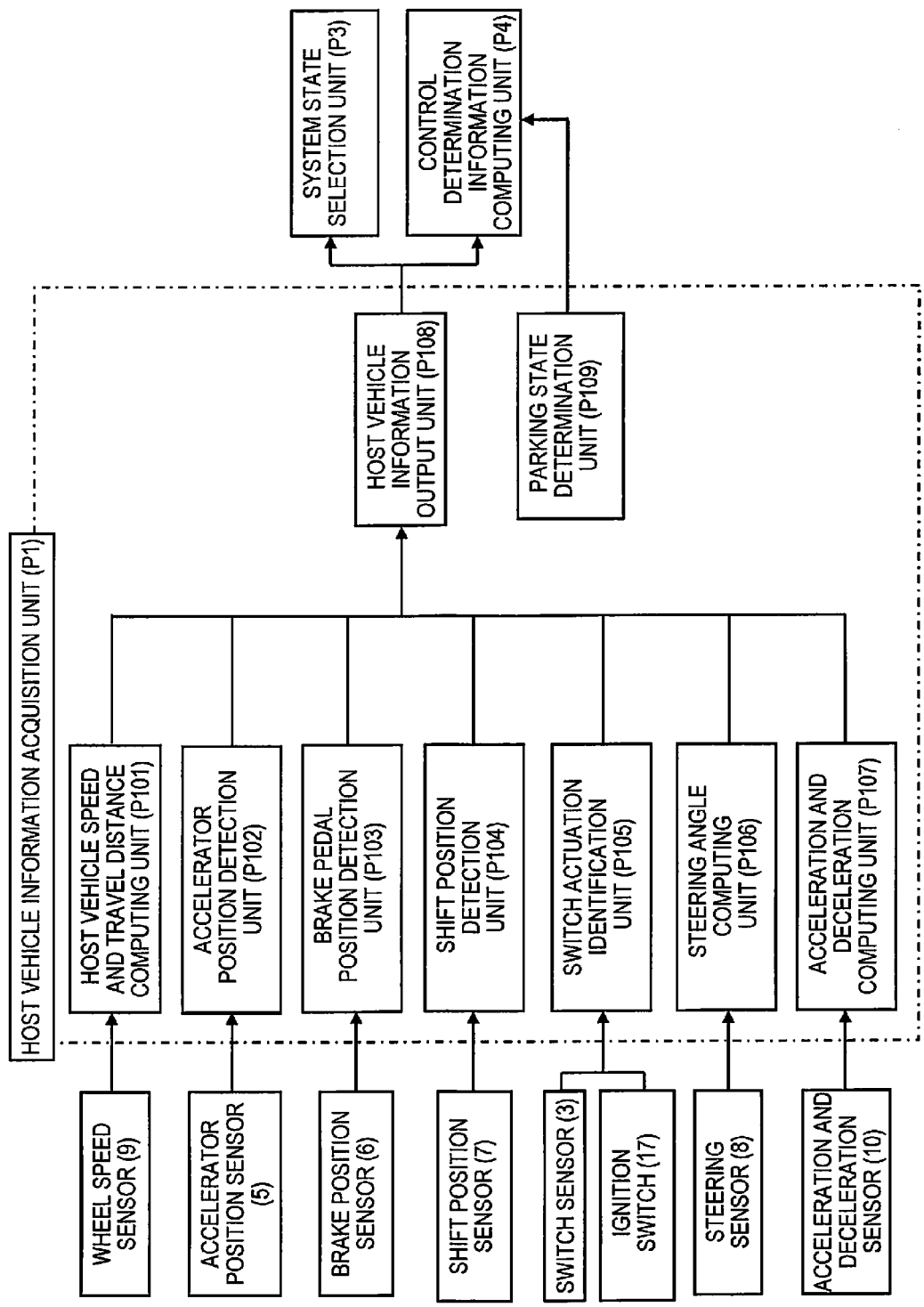
FIG. 3 is a block diagram of the host vehicle information acquisition unit in FIG. 2.

FIG. 1 is a schematic view of a vehicle in the present embodiment; FIG. 2 is a block diagram of a vehicle control device in the present embodiment; FIG. 3 is a block diagram of the host vehicle information acquisition unit of FIG. 2; and FIG. 4 to FIG. 8 are diagrams for explaining the parking state determination made by the parking state evaluation unit in the present embodiment.

As illustrated in FIG. 1, the vehicle 1 in the present embodiment is provided with a controller 2, a switch sensor 3, a brake lamp 4, an accelerator position sensor 5, a brake pedal position sensor 6, a shift position sensor 7, a steering sensor 8, a wheel speed sensor 9, an acceleration and deceleration sensor 10, a nearby obstacle detection device 11, a remote obstacle detection device 12, a driving force generator 13, a brake force generator 14, an accelerator pedal reaction force generator 15, an alarm device 16, and an ignition switch 17. The respective sensors, devices, and so forth will be described below. The controller 2 will be described last.

The switch sensor 3 detects the state of a toggle switch that switches the vehicle control device 100 (later described) in the present embodiment between on and off, and outputs the detection results to the controller. Additionally, while not particularly illustrated, the switch may be provided inside the vehicle 1 and switched on and off in accordance with an operation by the driver of the vehicle 1.

As illustrated in FIG. 1, the brake lamp 4 is provided at the rear side 1a of the vehicle 1, and emits light on actuation of the brakes to notify other vehicles traveling behind that the vehicle 1 is decelerating. The accelerator position sensor 5 detects the position of the accelerator and outputs the detection value to the controller 2.

The shift position sensor 7 detects the position of the shift lever and outputs the detection result to the controller 2. The steering sensor 8 acquires the steering angle of the steering wheel and outputs the detection value to the controller 2. The wheel speed sensor 9 detects the number of rotations of the wheels on the vehicle 1, and outputs the detection value to the controller 2. The acceleration and deceleration sensor 10 detects the acceleration and deceleration of the vehicle 1, and outputs the detection value to the controller 2.

As shown in FIG. 1, the nearby obstacle detection device 11 detects a nearby obstacle 18 which is located within a nearby detection region A relatively close in relation to the vehicle 1, and outputs the detection value for the location and the speed of the nearby obstacle 18 to the controller 2. Thus, for example, a sonar device may be used for such kind of nearby obstacle detection device 11. Moreover, the nearby detection region A is given a pattern and illustrated at the rear side 1a of the vehicle 1 in FIG. 1.

Finally, the nearby detection region is not particularly limited and may be for example a region within a distance of 1 m to 2 m from the vehicle 1.

As illustrated in FIG. 1, there are four nearby obstacle detection devices 11 of the present embodiment placed on each of the front side 1b and the rear side 1a of the vehicle 1. Additionally, in the present embodiment the nearby obstacle detection devices 11 on the rear side 1a are referred to in order from the top center of in the diagram as the nearby obstacle detection device 11 (R2), the nearby obstacle detection device 11 (R1), nearby obstacle detection device 11 (L1), and the nearby obstacle detection device 11 (L2). Furthermore, as illustrated in the same drawing, in the present embodiment, the respective detectable regions B (the variegated pattern portion in the drawing) of the nearby obstacle detection devices 11 (R1), (L1) at the center are relatively wider than the respective detectable regions B of the nearby obstacle detection devices 11 (R2), (L2) at both ends; however the detectable regions are not particularly limited. Finally, the detectable regions B are regions where each of the nearby obstacle detection devices 11 (R2), (R1), (L1), (L2) are able to detect a nearby obstacle 18.

When an obstacle enters a detectable region C, the remote obstacle detection device 12 detects the obstacle and outputs the detection to the controller 2. In the present embodiment, as illustrated in FIG. 1, the remote obstacle detection device 12 is capable of detecting a remote obstacle 19 at a location more remote than the above-mentioned nearby detection region A; furthermore the detectable region C extends further out than the detectable region Bc of the nearby obstacle detection device 11. In the present embodiment, to remote obstacle detection devices 12 are placed at each of the rear side 1a and the front side 1b of the vehicle 1; two remote obstacle detection devices 12 are placed at each of the rear side 1a and the front side 1b of the vehicle 1 in the present embodiment and detect the remote obstacle 19 located substantially in the same direction as the direction in which the nearby obstacle detection device 11 detects the nearby obstacle 18. Thus, for example, radar may be used for such kind of remote obstacle detection device 12.

The driving force generator 13 is for example a device that produces a driving force for the vehicle 1, such as an engine or motor. The brake force generator 14 is a device that produces brake pressure, and is controlled by the controller 2. The accelerator pedal reaction force generator 15 is a device that produces a reaction force in relation to the pressing of the accelerator and is controlled by the controller 2.

The alarm device 16 is a device that warns the driver of the presence of an obstacle 18, 19 based on a command from the controller 2.

This alarm device 16 may be configured by a buzzer capable of producing a warning sound such as "beep, beep, beep", or an indicator capable of flashing a light, or a monitor for a navigation system capable of having a monitor and the link periodically flashing the periphery of an image and so on.

The ignition switch 17 outputs a startup or a stop signal for the vehicle 1 to the controller 2 based on an on or off toggle switch operation of the driver.

Next, the controller 2 in the present embodiment will be described.

The controller 2 may be configured by a computer such as an electronic control unit (ECU) having functions capable of executing driving assistance control of for the vehicle 1 one; as illustrated in FIG. 2 the controller 2 has a host of vehicle information acquisition unit P1, a periphery information acquisition unit P2, a system state selection unit P3, a control determination information computing unit P4, a brake control actuation determination unit P5, a brake control unit P6, an accelerator pedal actuation reaction force determination unit P7, an accelerator pedal actuation reaction force control unit P8, an alarm determination unit P9, an alarm control unit P10, a driving force control determination unit P11, and a driving force control unit P12.

As illustrated in FIG. 3, the host vehicle information acquisition unit P1 has a host vehicle speed and travel distance computing unit P101, an accelerator position detection unit P102, a brake pedal position detection unit P103, a shift position detection unit P104, a switch actuation identification unit P105, a steering angle computing unit P106, a acceleration and deceleration computing unit P107, a host vehicle information output unit P108, and a parking state determination unit P109.

The host vehicle speed and travel distance computing unit P101 acquires a detection value for the number of rotations of the wheels output from the wheel speed sensor 9, calculates the speed of the vehicle 1, integrates the calculated speed, to and also calculates the traveling distance of the vehicle 1. Further, when calculating the speed of the vehicle the host vehicle speed and travel distance computing unit P101 may use filtering or averaging.

The accelerator position detection unit P102 acquires a detection value of the operation position of the accelerator from the accelerator position sensor 5, and detects the accelerator position (the amount of pressing of the accelerator), and outputs that detection result to the host vehicle information output unit P108. The brake pedal position detection unit P103 acquires a detection value of the operation position of the brake pedal output from the break position sensor 6, and the text detects whether or not the driver has pressed the brake, and outputs that detection results to the host vehicle information output unit P108. The shift position detection unit P104 acquires a detection value of the position of the shift lever output from the shift position sensor 7 and outputs that detection value to the host vehicle information output unit P108.

The switch actuation identification unit P105 detects the detection results of the on-off state of the vehicle control device 100 output from the switch sensor 3, and outputs that detection results to the host vehicle information output unit P108.

Further the switch actuation identification unit P105 acquires a signal output from the ignition sensor 17, detects the on-off states of the engine of the vehicle 1, and outputs the detection results to the host vehicle information output unit P108.

The steering angle computing unit P106 acquires a detection value of the steering angle of the steering wheel output from the steering wheel sensor 8, calculates the steering angle of the steering wheel, and outputs that calculation results to the host vehicle information output unit P108. Further, the steering angle computing unit P106 may use filtering when calculating the steering angle.

The acceleration and deceleration computing unit P107 acquires a detection value of the acceleration or the deceleration of the vehicle 1 output from the acceleration and deceleration sensor 10, calculates the acceleration or the deceleration of the vehicle 1, and outputs the detection calculation results to the host vehicle information output unit P108.

The host vehicle information output unit P108 collects the detection results (calculation results) from the above described the host vehicle speed and travel distance computing unit P101, the accelerator position detection unit P102, the brake pedal position detection unit P103, the shift position detection unit P104, the switch actuation identification unit P105, the steering angle computing unit P106, and the acceleration and deceleration computing unit P107, and outputs the results to the system estate selection unit P3 and the control determination information computation unit P4.

The parking state determination unit P109 acquires various detection values from the host vehicle speed and travel distance computing unit P101, the shift position detection unit P104, and the later described nearby obstacle presence determination unit P203 in the peripheral information acquisition unit P2, and so forth, and determines whether "the vehicle 1 is in a state of entering a planned parking place" (hereinafter, called the entry state), or "the vehicle 1 is in a state of exiting a parking place" (hereinafter, called the exit state), and outputs the determination results to the control determination information computation unit P4. In the present embodiment, the entry state and the exit state are collectively called a parking state.

The determination protocol in the parking state determination unit P109 for determining the parking state of the vehicle 1 will be explained in detail below.

First, the determination protocol at a parking lot when entering a planned parking place, and when exiting a parking place will be described.

Figure 4:
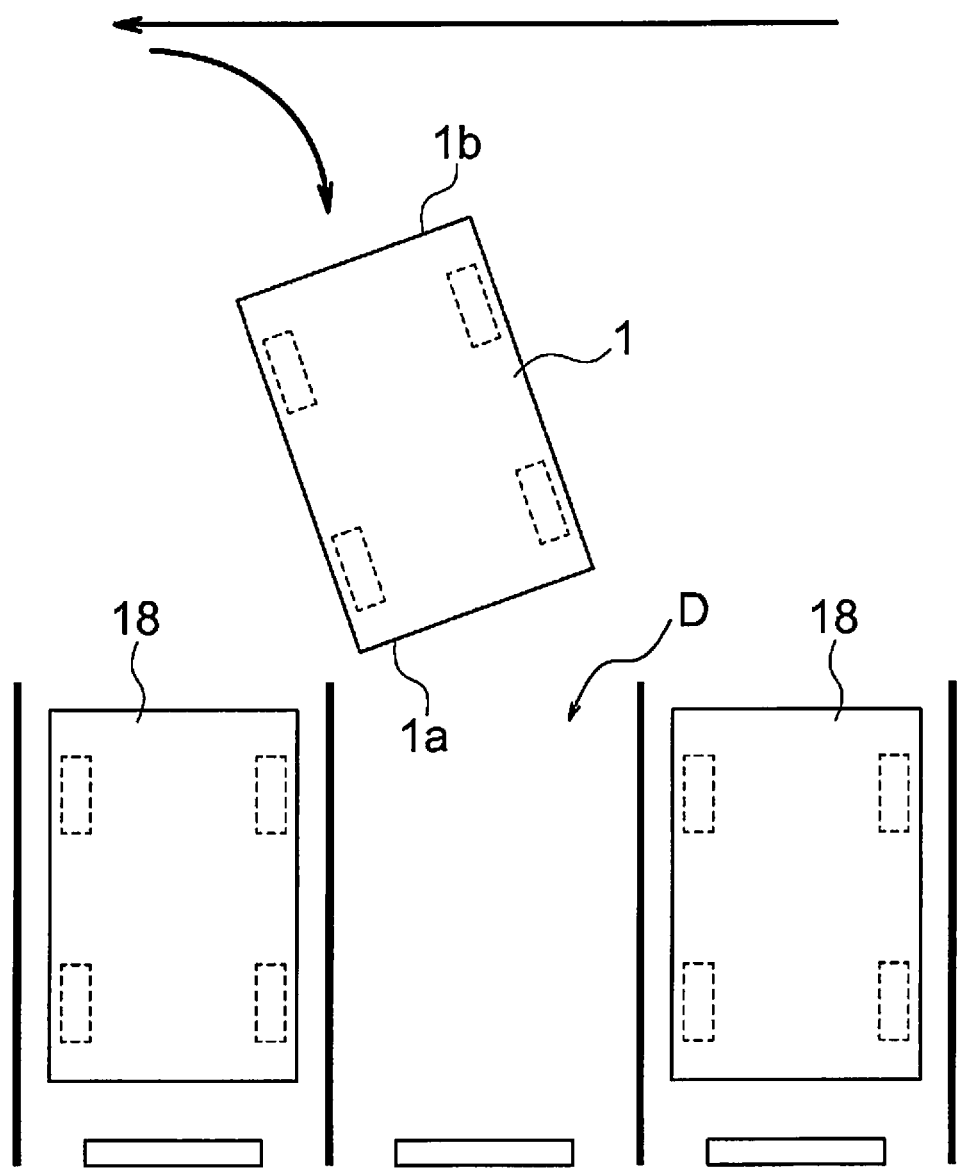
FIG. 4 is a diagram for explaining the parking state determination made by the parking state evaluation unit in the first embodiment of the present invention (Example 1).

In the present embodiment, as illustrated in FIG. 4, after the vehicle 1 travels forward for no less than a predetermined distance (for example, 10 m), the reversing of the vehicle 1 is determined to be an entry state. Further, FIG. 4 illustrates a case where the vehicle 1 is reversing into a parking spot D to park.

Further, the parking state determination unit P109 determines that the vehicle 1 is in the exit state from a parking place under the condition that the vehicle 1 is in reverse after any one of the following states (1) to (3). In other words, the state (1) is a state where the vehicle is stopped for predetermined time (for example, a state where the shift position is in park for no less than 10 seconds); the state (2) is a state where the vehicle speed is no more than a predetermined value (for example 1 km/h), and no nearby obstacle 18 has been detected; and the state (3) is a state where the nearby obstacle detection devices 11 (L1), (R1) located at the center on the rear side 1a detect a nearby obstacle 18 near the traveling direction of the vehicle 1 (reversing direction in the example), and the distance to the nearby obstacle 18 from the vehicle 1 is no more than a predetermined value (for example 0.1 m).

Next, a parallel parking situation will be described.

Figure 5:
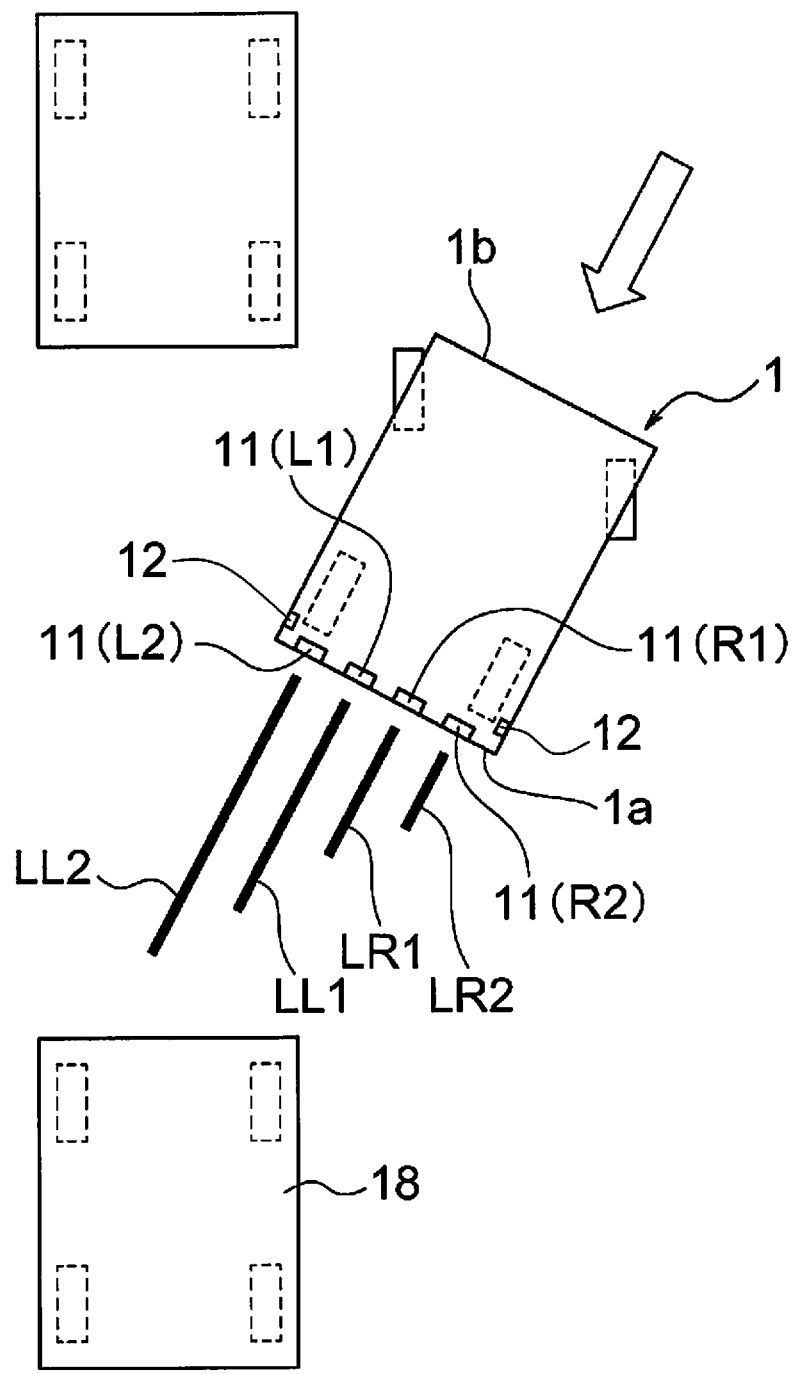
FIG. 5 is a diagram for explaining the parking state determination made by the parking state evaluation unit in the first embodiment of the present invention (Example 2).

As illustrated in FIG. 5, first is described the situation of the vehicle 1 reversing toward the left side in the drawing to parallel park.

When parallel parking in this manner, the parking state determination unit P109 determines that the vehicle 1 is in an entry state when either one of the following (4), or (5) is satisfied.

Figure 7:
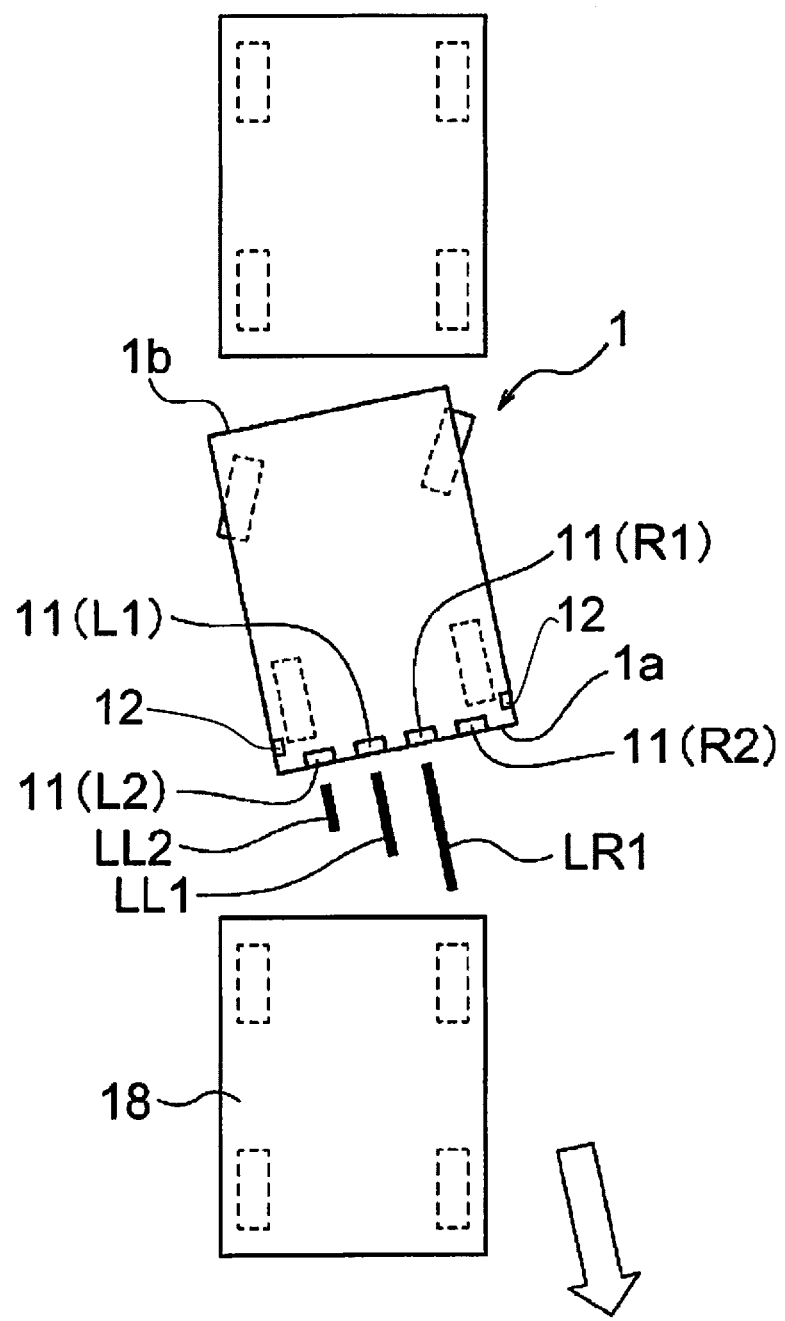
FIG. 7 is a diagram for explaining the parking state determination made by the parking state evaluation unit in the first embodiment of the present invention (Example 4).
Figure 8:
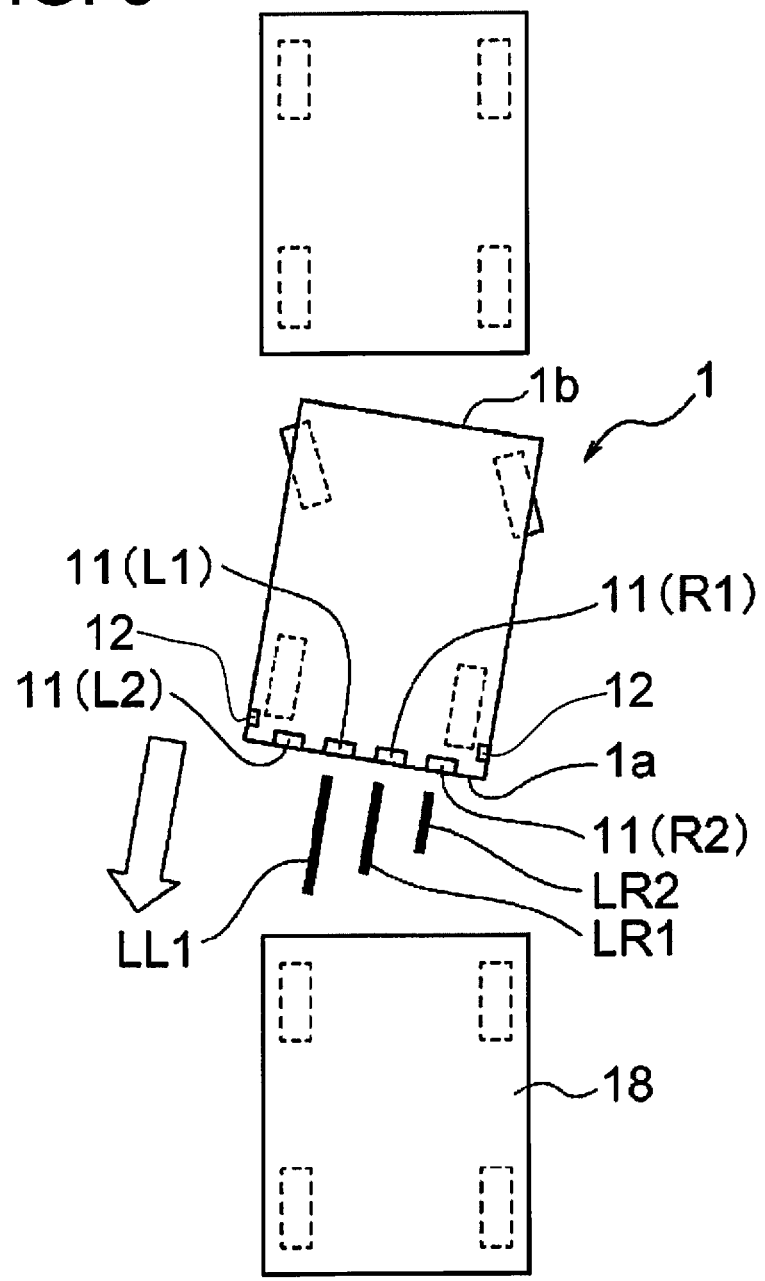
FIG. 8 is a diagram for explaining the parking state determination made by the parking state evaluation unit in the first embodiment of the present invention (Example 5).

That is, as illustrated in FIG. 5, the state (4), is a state where the nearby obstacle detection devices 11 (L2), (L1), (R1) detects and nearby obstacle 18, and the sensing distances LL2, LL1, LR1 of the nearby obstacle detection devices 11 (L2), (L1), (R1) grow shorter in the order of the nearby object detection devices 11 (L2), (L1), (R1) (LL2≥LL1≥LR1). Further the sensing distance LL2 is the distance from the vehicle 1 to the nearby obstacle 18 calculated by the controller 2 based on the detection value output by the nearby obstacle detection device 11 (L2); the sensing distance LL1 is the distance from the vehicle 1 to the nearby obstacle 18 calculated by the controller 2 based on the detection value output by the nearby obstacle detection device 11 (L1); the sensing distance LR1 is the distance from the vehicle 1 to the nearby obstacle 18 calculated by the controller 2 based on the detection value output by the nearby obstacle detection device 11 (R1). Further, the sensing distance LR2 described later is the distance from the vehicle 1 to the nearby obstacle 18 calculated by the controller 2 based on the detection value output by the nearby obstacle detection device 11 (R2). Additionally, in the same drawing the sensing distances LL2, LL1, LR1, LR2 are represented by a visible thick line (FIG. 6 to FIG. 8 are illustrated in the same manner).

Further, the state (5) is the state where the nearby obstacle detection devices 11 (L2), (L1) detect a nearby obstacle 18, and the sensing distance LL2 is longer than the sensing distance LL1 (LL2≥LL1), and the nearby obstacle detection device 11 (R1) does not detect the nearby obstacle 18.

Moreover, the larger the difference between the sensing distances LL2, LL1, LR1 (the difference between the maximum value and the minimum value) the parking state determination unit P109 determines the greater the degree to which the vehicle 1 is entering a planned parking place. Additionally, the larger the number of nearby obstacle detection devices 11 that detect a nearby obstacle 18 the parking state determination unit P109 determines the greater the degree to which the vehicle 1 is entering a planned parking place.

Figure 6:
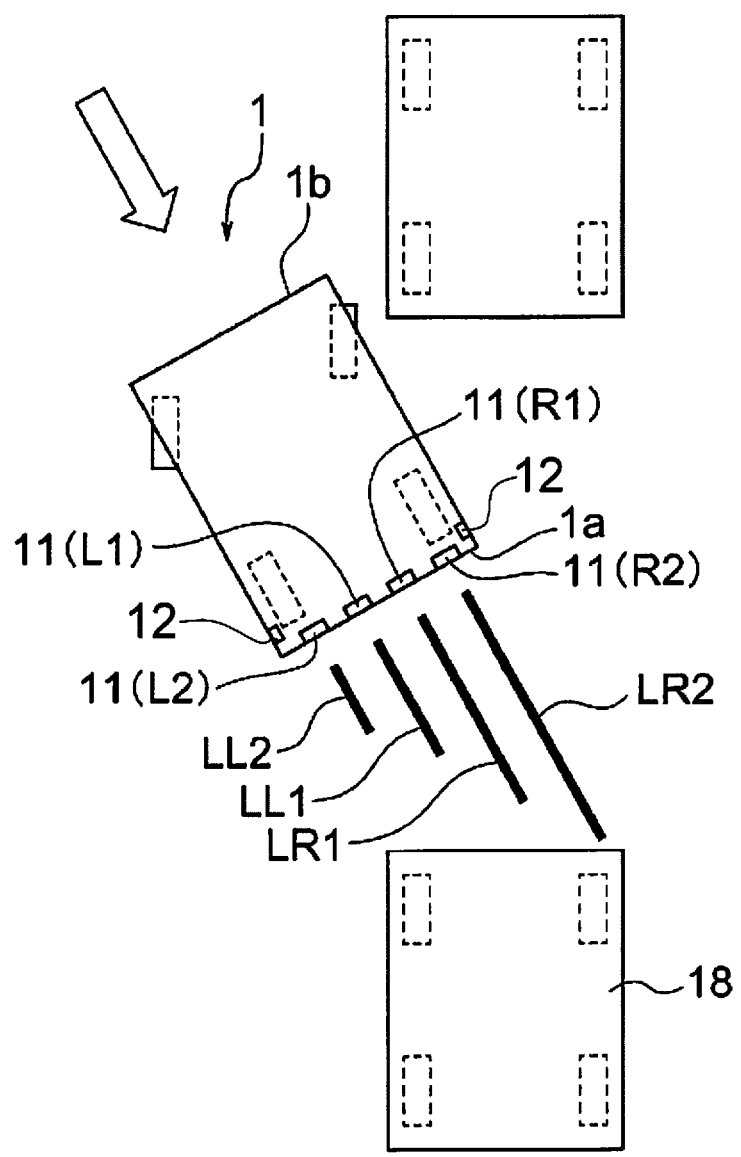
FIG. 6 is a diagram for explaining the parking state determination made by a parking state evaluation unit in the first embodiment of the present invention (Example 3).

As illustrated in FIG. 6, next is described the situation of the vehicle 1 reversing toward the right side in the drawing to parallel park.

When parallel parking in this manner, the parking state determination unit P109 determines that the vehicle 1 is in an entry state when any one of the following (6), or (7) is satisfied.

In other words, as illustrated in FIG. 6, the state (6) is a state where the nearby obstacle detection devices 11 (L1), (R1), (R2) detect a nearby obstacle 18, and the sensing distances LL1, LR1, LR2 are longer in the order of the nearby obstacle detection devices 11 (L1),(R1),(R2) (LL1≤LR1≤LR2).

Furthermore, the state (67) is a state where the nearby obstacle detection devices 11 (R1) (R2) detect a nearby obstacle 18, and the sensing distance LR1 is shorter than the sensing distance LR2 (LR1≤LR2), and the nearby obstacle detection device 11 (L1) does not sense the nearby obstacle 18.

Furthermore, the parking state determination unit P109 determines that the larger the difference in the sensing distances LR2, LR1, LL1 (the difference between the maximum value and the minimum value) the greater the degree to which the vehicle 1 is entering a planned parking place. Additionally, the parking state determination unit P109 determines that the larger the number of the nearby obstacle detection devices 11 that detected a nearby object 18, the greater the degree to which the vehicle 1 is entering the planned parking place.

As illustrated in FIG. 7, next is described the situation of the vehicle 1 reversing toward the right side of the drawing and exiting from the parallel-parked parking place. In this case, the parking state determination unit P109 determines that the vehicle 1 is in an exit state when any one of the following (8) to (10) is satisfied.

In other words, as illustrated in FIG. 7, the state (8) is a state where the nearby obstacle detection devices 11 (L2), (L1), (R1) detect a nearby obstacle 18, and the sensing distances LL2, LL1, LR1 are longer in the order of the nearby obstacle detection devices 11 (L2), (L1), (R1) (LL2≤LL1≤LR1).

Furthermore, FIG. 7 illustrates the state where the nearby obstacle detection devices (L2), (L1), (R1) detect the nearby obstacle 18, however the nearby obstacle detection device 11 (R2) does not detect the nearby obstacle 18.

Additionally, the state (9) is a state where the nearby obstacle detection devices 11 (L2), (L1) detect a nearby obstacle 18, and the sensing distance LL2 is shorter than the sensing distance LL1 (LL2≤LL1).

Further, the state (10) is a state where only the nearby obstacle detection device 11 (L2) detects the nearby obstacle 18, and the sensing distance LL1 is no more than a predetermined value (for example, 1 m).

The parking state determination unit P109 determines that the larger the difference in the sensing distances LL2, LL1, LR1 (the difference between the maximum value and the minimum value) the greater the degree to which the vehicle 1 is exiting from the parking place. Furthermore, the parking state determination unit P109 determines that the smaller the number of nearby obstacle detection devices 11 that detected the nearby obstacle 18, the greater the degree to which the vehicle 1 is exiting from the parking place.

As illustrated in FIG. 8, next is described the situation of reversing toward the left side of the diagram and exiting from a parallel-parked parking place.

In this case, the parking state determination unit P109 determines that the vehicle 1 is in the exit state when any one of the following (11) to (13) states is satisfied.

In other words, as illustrated in FIG. 8 the state (11) is a state where the nearby obstacle detection devices 11 (L1), (R1), (R2) detect a nearby obstacle 18, and the sensing distances LL1, LR1, LR2 are shorter in the order of the nearby obstacle detection devices 11 (L1), (R1), (R2) (LL1≥LR1≥LR2). Furthermore, in the same drawing illustrates the situation where the nearby obstacle detection devices 11 (L1), (R1), (R2) detect the nearby obstacle 18, while the nearby obstacle detection device 11 (L2) does not detect the nearby obstacle.

The state (12) is a state where the nearby obstacle detection devices 11 (R1), (R2) detect a nearby obstacle 18, and the sensing distance LR1 is longer than the sensing distance LR2 (LR1≥LR2).

Additionally, the state (13) is a state where only the nearby obstacle detection device 11 (R2) detects a nearby obstacle 18, and the sensing distance LR2 are shorter is no greater than a predetermined value (for example, 1 m).

Moreover, the parking state determination unit P109 determines that the larger the difference in the sensing distances LL1, LR1, LR2 (the difference between the maximum value and the minimum value) the greater the degree that the vehicle 1 is exiting from the parking place. In addition, the parking state determination unit P109 determines that the smaller the number of the nearby obstacle detection devices 11 that detected the nearby obstacle 18 the greater the degree to which the vehicle 1 is exiting from the parking place.

Next, the periphery information acquisition unit P2 in FIG. 2 will be described.

Figure 9:
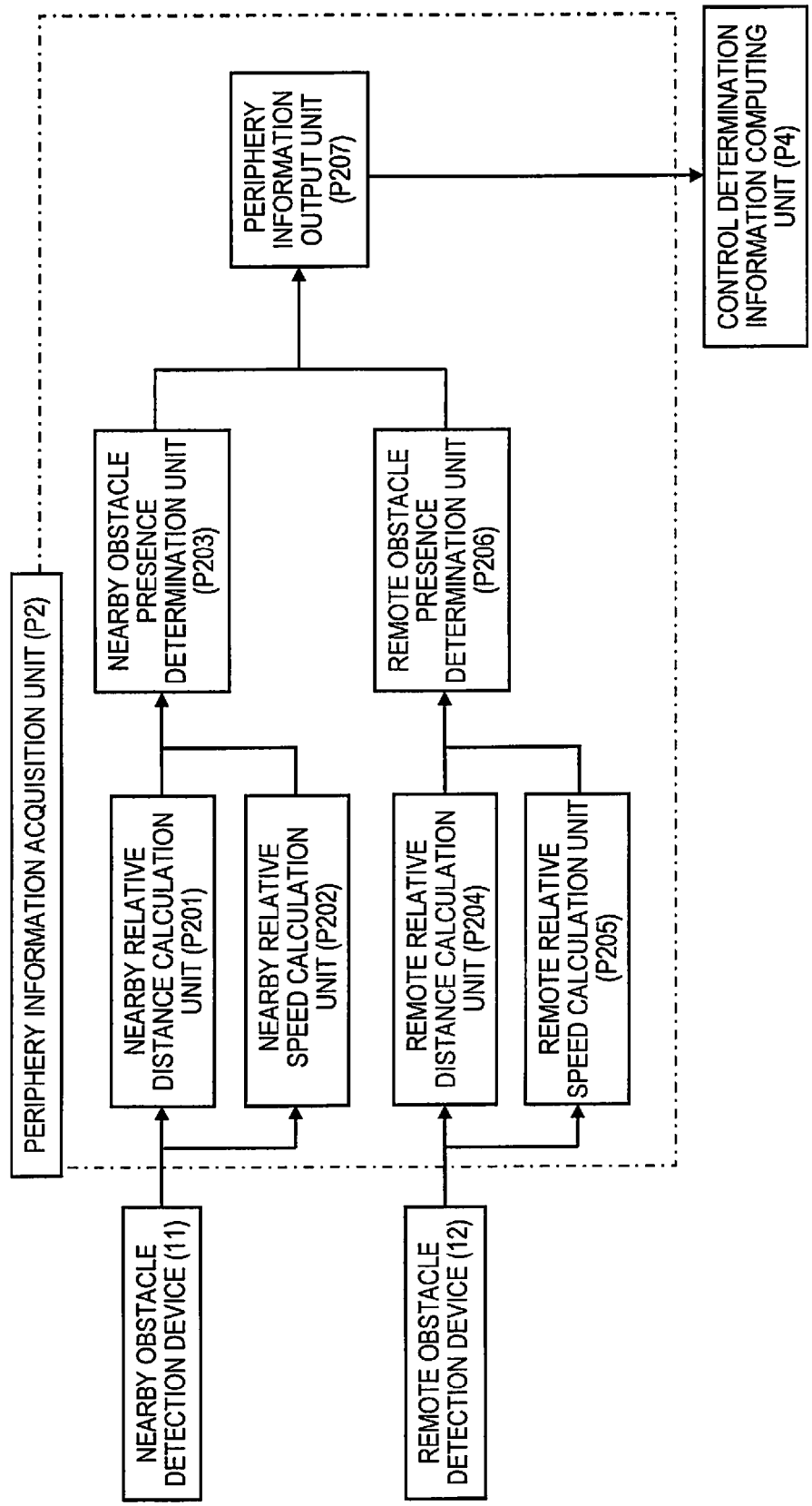
FIG. 9 is a block diagram of the periphery information acquisition unit in FIG. 2.

FIG. 9 is a block diagram of the periphery information acquisition unit in FIG. 2.

As illustrated in FIG. 9, the periphery information acquisition unit P2 has a nearby relative speed calculation unit P202, a nearby obstacle presence determination unit P203, a remote relative distance calculation unit P204, a remote relative speed calculation unit P205, a remote obstacle presence determination unit P206, and a periphery information output unit P207.

The nearby relative distance calculation unit P201 calculates the sensing distances LL2, LL1, LR1, LR2 from the vehicle 1 to the nearby obstacle 18 based on the detection value output from the nearby obstacle detection devices 11 (L2), (L1), (R1), (R2). Meanwhile, the nearby relative speed calculation unit P202 calculates the relative speed of the nearby obstacle 18 in relation to the vehicle 1 based on the detection value output from the nearby obstacle detection device 11. The nearby relative distance calculation unit P201, and the nearby relative speed calculation unit P202 may use filtering when calculating the distances and the relative speeds.

The nearby obstacle presence determination unit P203 determines the presence or absence of a nearby obstacle 18 based on calculation results from the nearby relative distance calculation unit P201 and the nearby relative speed calculation unit P202.

For example, the remote obstacle presence determination unit P206 can determine the presence of a remote obstacle in 19 in the case that any one of the calculated sensing distances LL2, LL1, LR1, LR2 is within a predetermined value.

The remote relative distance calculation unit P204 calculates the distance between the vehicle 1 and the remote obstacle 19 based on the detection value output from the remote obstacle detection device 12. Meanwhile, the remote relative speed calculation unit P205 calculates the relative speed of the remote obstacle 19 in relation to the vehicle 1 based on the detection value output from the remote obstacle detection device 12.

Further, the remote relative distance calculation unit P204 and the remote relative speed calculation unit P205 may use filtering when calculating the distances or the relative speeds.

The remote obstacle presence determination unit P206 determines the presence or absence of a remote obstacle 19 based on the calculation results from the remote relative distance calculation unit P204 and the remote relative speed calculation unit P205. For example, the remote obstacle presence determination unit P206 will determine that a remote obstacle 19 is present when the remote relative distance calculation unit P204 calculates a distance that is within a predetermined value.

The periphery information output unit P207 outputs the determination results from the nearby obstacle presence determination unit P203 and the remote obstacle presence determination unit P206 to the control determination information computing unit P4, and outputs the calculation results from the nearby relative distance calculation unit P201, and the nearby relative speed calculation unit P202, and the remote relative distance calculation unit P204, and the remote relative speed calculation unit P205 to the control determination computing unit P4.

Next, the system state selection unit P3 in FIG. 2 will be described.

The system state selection unit P3 executes finally determines the on or off of the vehicle control device 100 based on the switch state identified by a P105 in the host vehicle information acquisition unit P1, and outputs the execution determination results to the control determination information computing unit P4.

Next, the control determination information computing unit P4 will be described.

Figure 10:
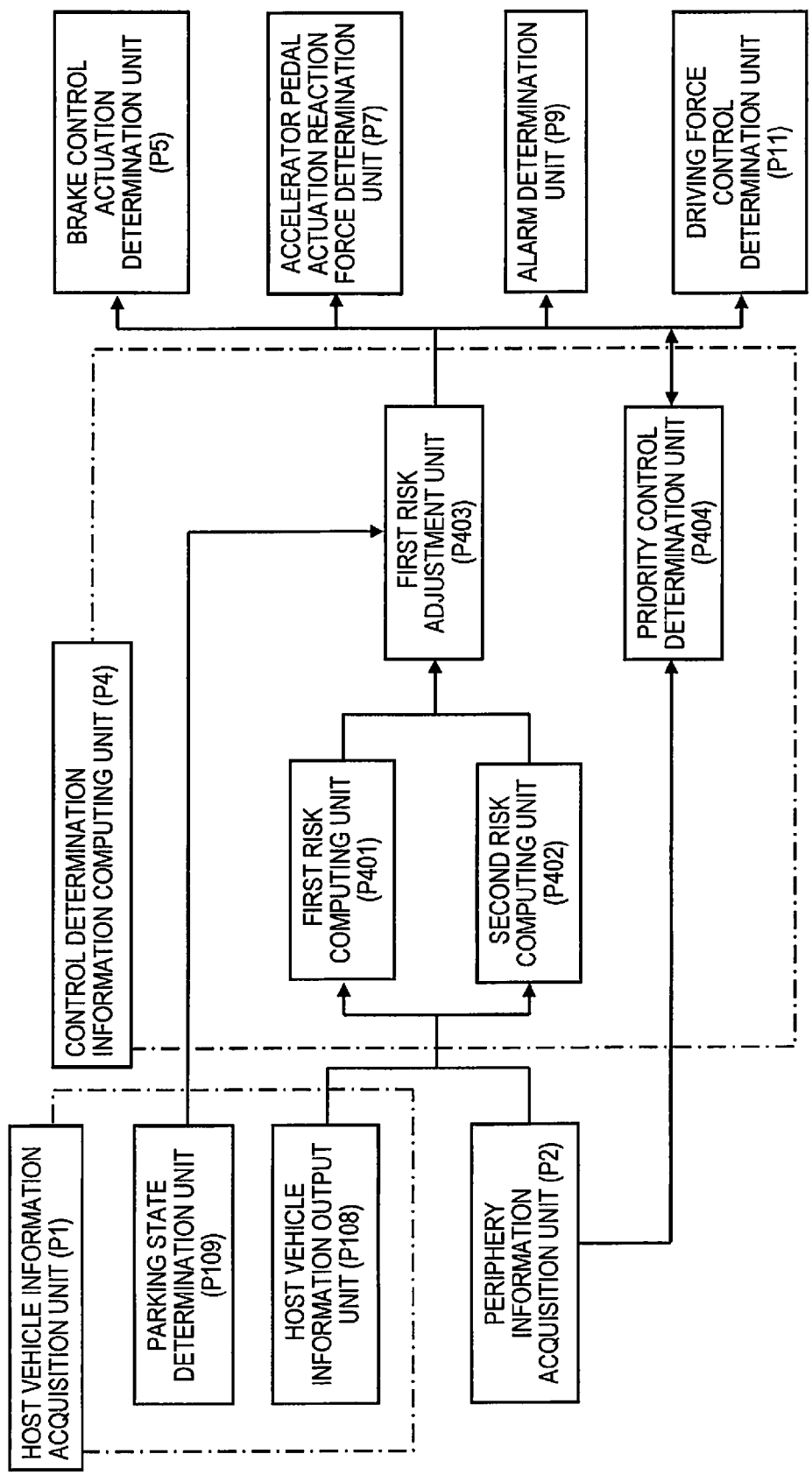
FIG. 10 is a block diagram of the control determination information computing unit in FIG. 2.
Figure 11:
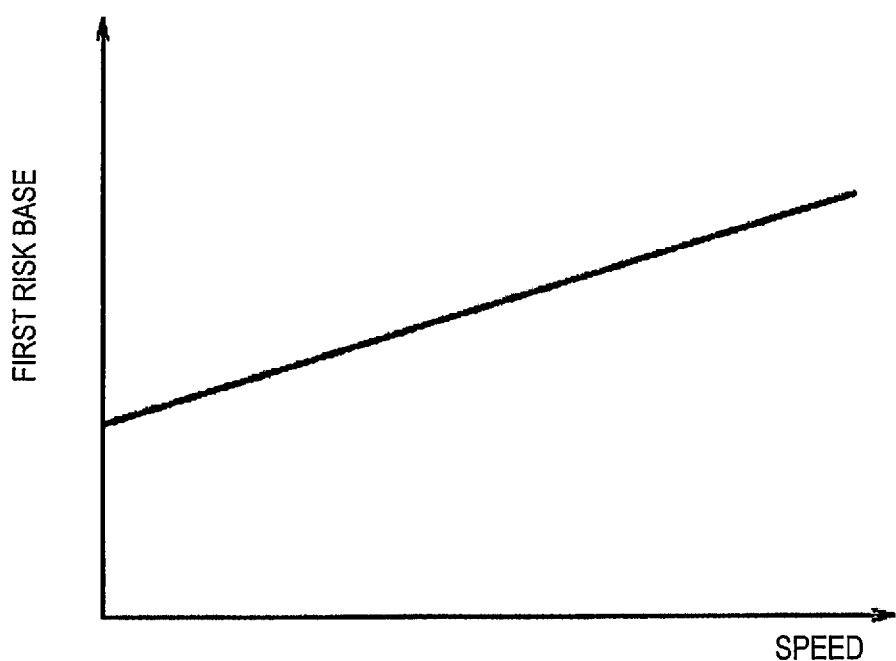
FIG. 11 is a graph for explaining a first risk base in the first embodiment of the present invention.
Figure 12:
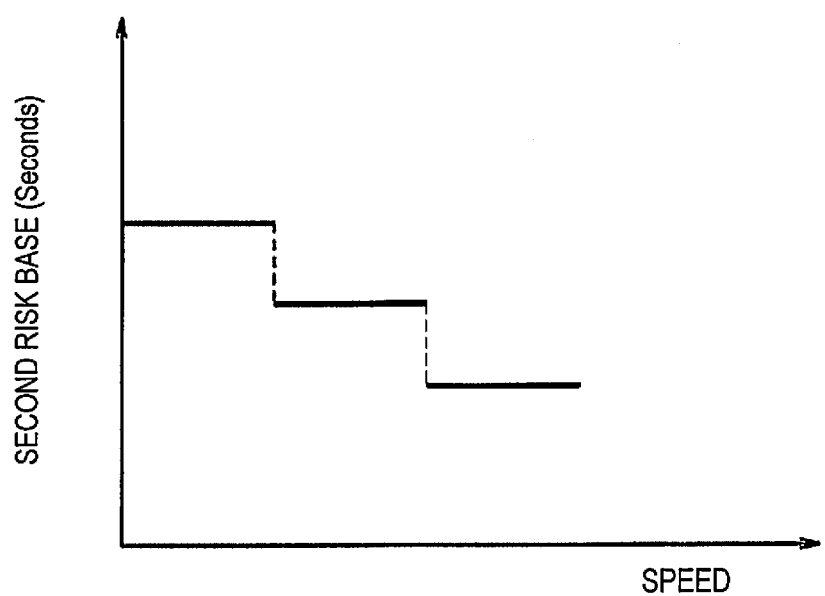
FIG. 12 is a graph for explaining a second risk base in the first embodiment of the present invention.
Figure 13:
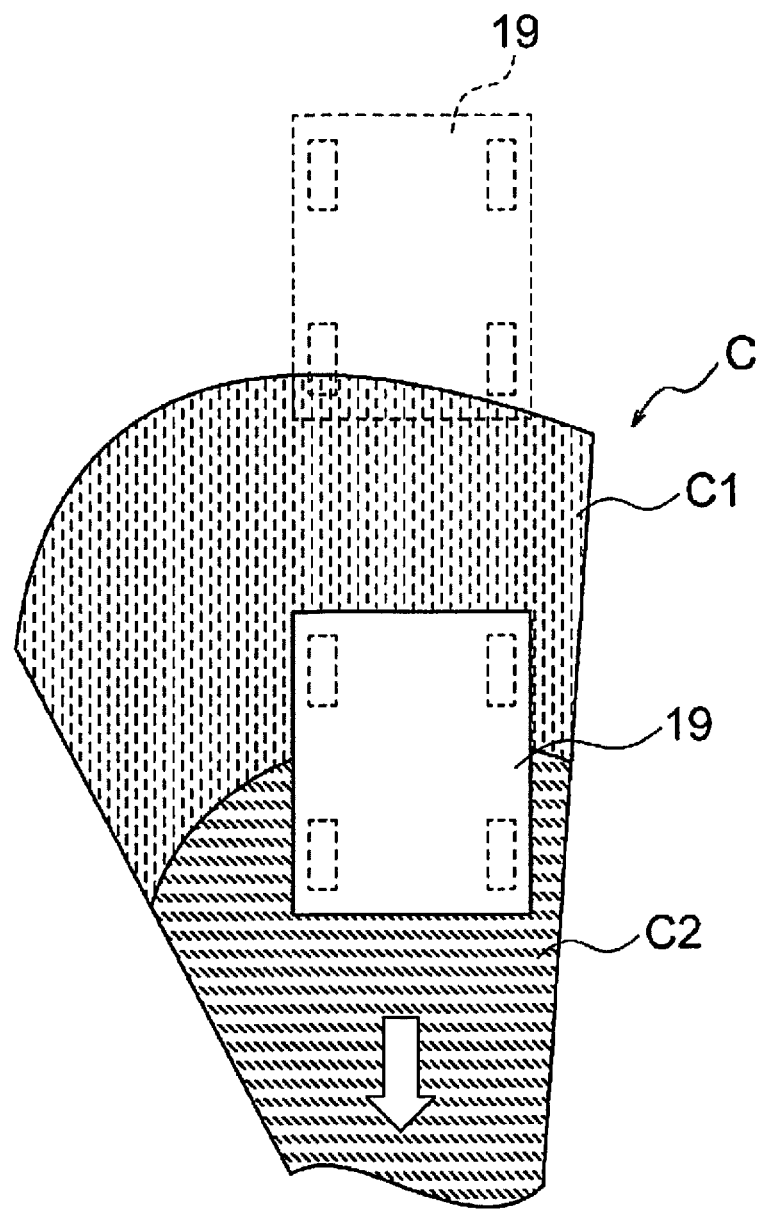
FIG. 13 illustrates a scenario in the first embodiment of the present invention where a warning or vehicle control is executed.
Figure 14:
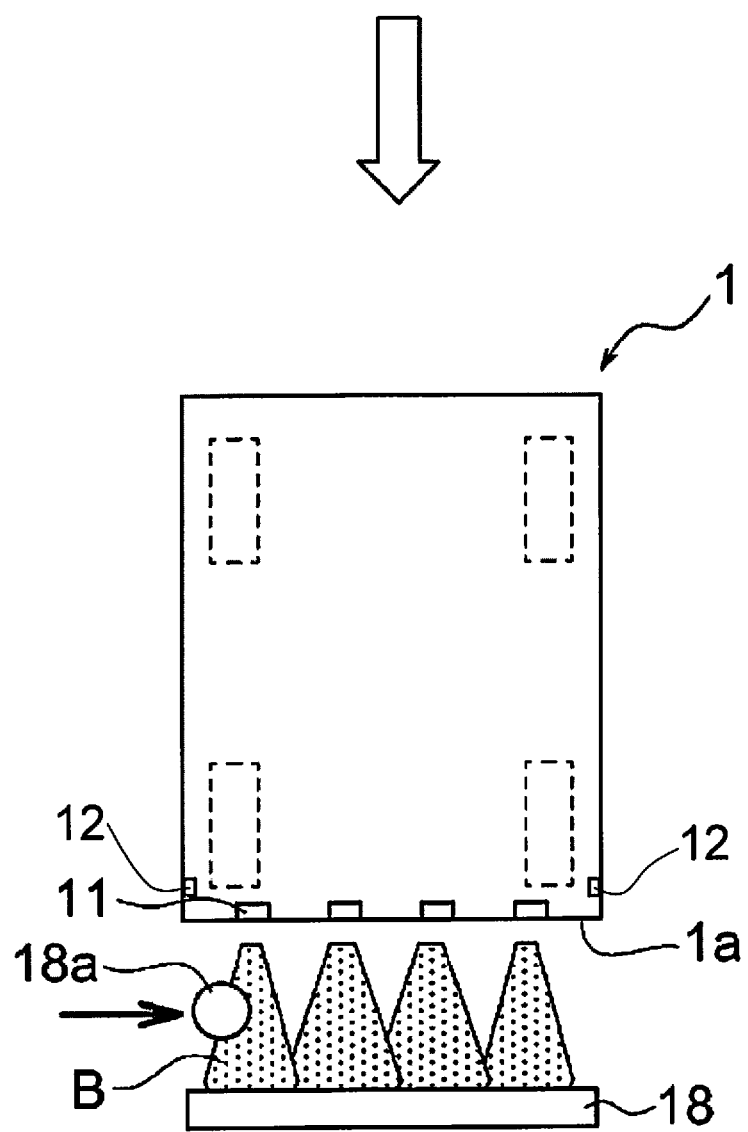
FIG. 14 is a diagram for explaining a scenario where a priority control determination unit functions in the first embodiment of the present invention (Example 1).
Figure 15:
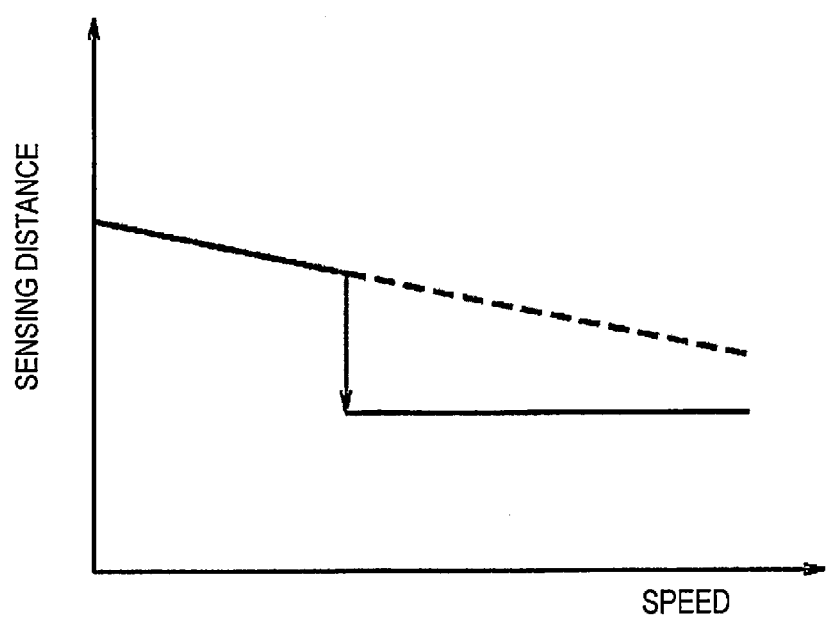
FIG. 15 is a graph for explaining the determination protocol of the priority control determination unit in the first embodiment of the present invention (Example 1).
Figure 16:
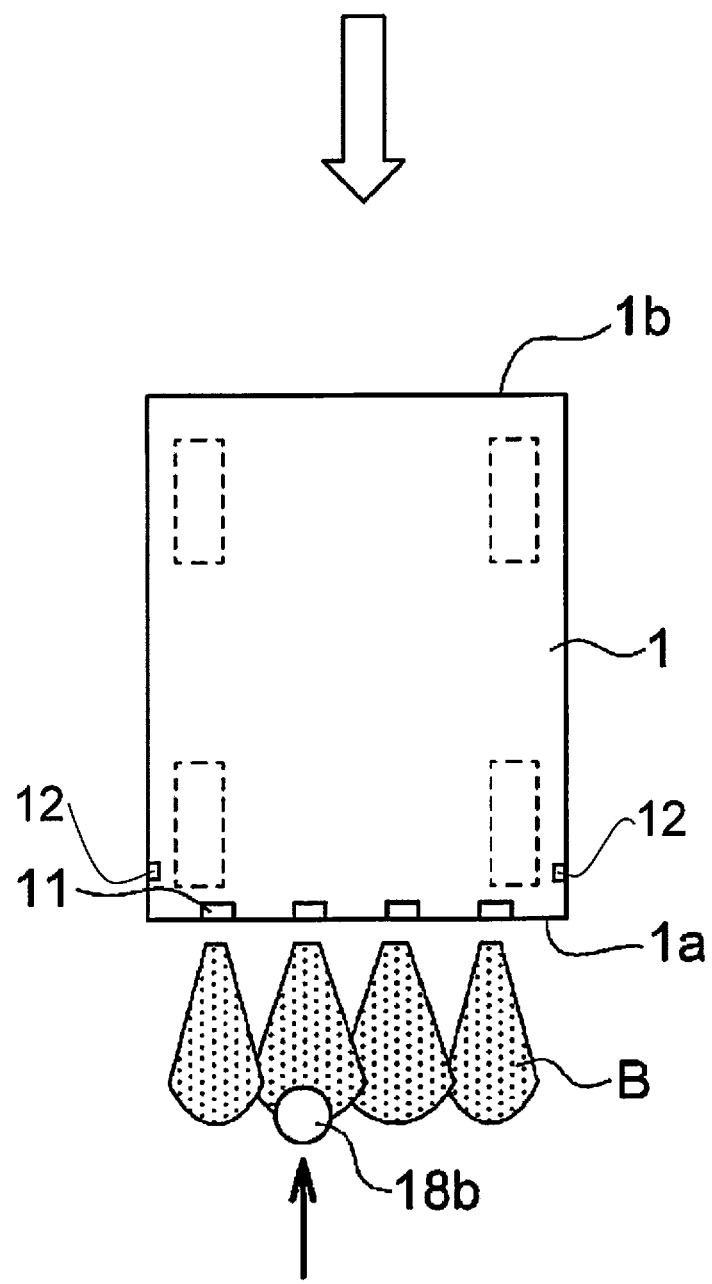
FIG. 16 is a diagram for explaining a scenario where the priority control determination unit functions in the first embodiment of the present invention (Example 2).
Figure 17:
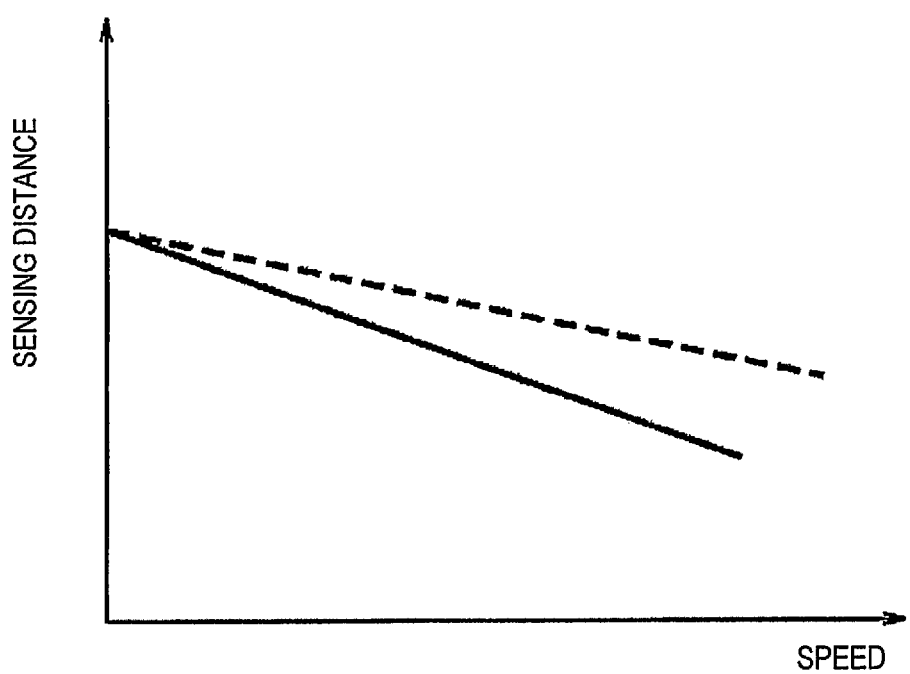
FIG. 17 is a graph for explaining the determination protocol of the priority control determination unit in the first embodiment of the present invention (Example 2).

FIG. 10 is a block diagram of the control determination information computing unit in FIG. 2; FIG. 11 is a graph for explaining a first risk base in the present embodiment; FIG. 12 is a graph for explaining a second risk base in the present embodiment; FIG. 13 illustrates a scenario in the present embodiment where a warning or vehicle control is executed; FIG. 14 and FIG. 16 are diagrams for explaining the scenarios where a priority control determination unit functions in the present embodiment; and FIG. 15 and FIG. 17 are graphs for explaining the determination protocol of the priority control determination unit in the present embodiment.

As illustrated in FIG. 10, the control determination information computing unit P4 has a first risk computing unit P401, a second risk computing unit P402, a first risk adjustment unit P403, and a priority control determination unit P4040. Additionally, in the present embodiment, the system estate selection unit P3 finally determines the turning on of the vehicle control device 100 (causes to the device to operate), and when the shift position sensor 7 detects that the shift operation position is reverse (R), the control determination information computing unit P4 carries out control computations. Moreover conditions such as the vehicle speed falling below a predetermined threshold, or the steering angle falling below a predetermined threshold may be added as conditions for the control determination information computing unit P4 to carry out control computations.

The first risk computing unit P401 computes a first risk when the periphery information acquisition unit P2 determines that a nearby obstacle 18 is present.

More specifically, the first risk computing unit P401 computes a first risk base RS1 indicative the possibility that the vehicle 1 will contact the nearby obstacle 18, calculates a first risk base RS1_K1 by multiplying the first risk base RS1 by a coefficient K1 used for actuation braking control determination by the brake control operation determination unit P5, and calculates a first risk RS1_K2 by multiplying of the first risk base RS1 by a coefficient K2 used for the accelerator pedal reaction force control determination by the accelerator pedal reaction force control determination unit P7. Additionally, the first risk computing unit P401 calculates a first risk RS1_K3 by multiplying the first risk base RS1 one by a coefficient K3 used for alarm determination by the alarm determination unit P9, and calculates a first risk RS1_K4 by multiplying the first risk day's base RS1 one by a coefficient K4 for used for driving force control determination by the driving force control determination unit P11. In this manner, in the present embodiment multiplying the first risk base RS1 by the coefficients K1~K4 changes the weighting for each determination.

Here, as illustrated in FIG. 11, the above mentioned first risk base RS1 may be computed by the first risk computing unit P401 as a distance value that becomes larger in proportion to the speed of the vehicle 1. The first risk base RS1 may be set to a predetermined value when the vehicle speed is zero. Here, although the first risk base RS1 of the present embodiment is computed as a distance value, the first risk base RS1 is not limited thereto, and the first risk base RS1 may be computed as a time value in accordance with the traveling speed of the nearby obstacle 18.

In addition, in the present embodiment the respective coefficients K1~K4 are set to values between 0~1 to grow larger in the order from K1, K2, K4, K3 (K1≤K2≤K4≤K3), and the first risk RS1_K1, RS1_K2, RS1_K4, RS1_K3 also grows in that order (RS1_K1≤RS1_K2≤RS1_K4≤RS1_K3). Thus, in the present embodiment, the vehicle 1 will be controlled in the order of a warning from the alarm device 16, a deceleration by the driving force generator 13 (deceleration by reducing the accelerator opening degree), a reaction force generated to the accelerator pedal by the accelerator pedal reaction force generation device 15, and deceleration by the brake force generator 14 (deceleration by increasing the brake pressure). In other words, in the present embodiment, first, a warning is executed to alert the driver of the presence of a nearby obstacle, next vehicle control is carried out gradually from the vehicle control with a low degree of deceleration, to thereby suppress the stress associated with a sudden unintended deceleration from being put on the driver.

The second risk computing unit P402 computes a second risk when the periphery information acquisition unit P2 determines that a remote obstacle 19 is present.

More specifically, the second risk computing unit P402 computes a second risk base RS2, RS3 which represents the possibility that the vehicle 1 will contact a remote obstacle 19, in the same manner as the first risk, and calculates a second risk by multiplying the second risk base RS2, RS3 by the coefficients K1 to K4. First, the second risk base RS2, RS3 in the present embodiment will be described.

The second risk base RS2 is computed as a distance value that increases in proportion to the speed of the vehicle 1 in the same manner as the first risk base illustrated in FIG. 11. Additionally, the base RS2 may be set to a predetermined value when the vehicle speed is zero.

Whereas as illustrated in FIG. 12, the second risk base RS3 is computed as a time value such that the time value decreases for the greater the traveling speed of the remote obstacle 19 (for example, 3 seconds). Moreover, the traveling speed of the remote obstacle 19 can be calculated by subtracting the speed of the vehicle 1 from the relative speed of the vehicle 1 in relation to the remote obstacle 19.

The second risk computing unit P402 in the present embodiment calculates the second risk RS2_K1, RS 3_K1 by multiplying the second risk base RS2, RS3 calculated in the above manner by the coefficient K31 used for the braking control determination by the brake control determination unit P5, and calculates a second risk RS2_K2, RS3_K2 by multiplying the second risk base RS2, RS3 by the coefficient K2 used for the accelerator pedal reaction force control determination by the accelerator pedal reaction force control determination unit P7. Additionally, the second risk computing unit P402 calculates a second risk RS2_K3, RS3_K3 by multiplying the second risk base RS2, RS3 by the coefficient K3 used for the alarm determination by the alarm determination unit P9, and calculates a first risk RS2_K4, RS3_K4 by multiplying the second risk base RS2, RS3 by the coefficient K4 used for the driving force control determination by the driving force control determination unit P11. In this manner, in the present embodiment, the weights for the various determinations change by multiplying the second risk base RS2, RS3 by the coefficients K1~K4.

Here, in the present embodiment the respective coefficients K1~K4 are set between 0~1 to increase in the order of K1, K2, K4, K3 (K1≤K2≤K4≤K3), in same manner as the above described first risk. The second risk also increases in the order of RS2_K1, RS2_K2, RS2_K4, RS2_K3 (RS2_K1≤RS2_K2≤RS2_K4≤RS2_K3) and in the order of RS3_K1, RS3_K2, RS3_K4, RS3_K3 (RS3_K1≤RS3_K2≤RS3_K4≤RS3_K3). Therefore, in the present embodiment the vehicle 1 is gradually controlled in the order from a warning by the alarm device 16, then deceleration by the driving force generator 13 (deceleration due to the reduced accelerator position), then generation of reaction force on the accelerator pedal by the accelerator pedal reaction force generator 15, then deceleration by the brake force generator 14 (deceleration due to increased braking pressure).

For example, as illustrated in FIG. 13, when a remote obstacle 19 enters a first detection region C 1 a warning sound is generated by the alarm device 16, subsequently, when the remote obstacle 19 enters a second detectable region C2 driving force control is further carried out. In the same diagram the first detection region CI is located within the distance value of the above described second risk RS2_K3 within the detection region C for of the remote obstacle detection device 12; and the second detection region C2 is located within the distance value of the above described second risk RS2_K4 in the detection region C of the remote obstacle detection device 12.

In this manner, in the present embodiment, first a warning is executed to alert the driver of the presence of a remote object, and next, vehicle control is gradually carried out from the vehicle control having a low degree of deceleration, thereby suppressing the stress associated with a sudden unintended deceleration from being put on the driver.

The first risk adjustment unit P404 adjusts the first risk and the second risk calculated in the above-mentioned manner based on the determination results from the parking state determination unit P109 in the host vehicle information acquisition unit P1. Furthermore, the adjustment of the risk in the present embodiment will be described with the first risk RS1_K3 and the second risk RS2_K3 as reference.

When the parking state determination unit P109 determines that the vehicle 1 is in an entry state, the first risk adjustment unit P404 adjusts the first risk RS1_K3 to be larger and the second risk RS2_K3 to be smaller so that the warning to notify the driver of the presence of a nearby obstacle 18 is preferentially executed versus the warning to notify the driver of the presence of a remote obstacle 19. Additionally, this kind of risk adjustment may be accomplished by multiplying the first and second risks RS1_K3, RS2_K3 by such a risk adjustment gain.

In the following description a first risk adjustment gain multiplied by the first risk RS1_K3 is designated as G10 and a second risk adjustment gain multiplied by the second risk RS2_K3 is designated as G20. Additionally, a first risk RS1_K3_G10 represents the first risk after the first risk adjustment, and a second risk RS2_K3_G20 represents the second risk after the first risk adjustment.

In the present embodiment, when it is determined that the vehicle 1 is in the entry state, the first risk adjustment unit P404 sets the first risk adjustment gain G10 to a relatively large value (for example, a value greater than or equal to 1), and multiplies the first risk RS1_K3 by this first risk adjustment gain G10. Additionally, in this case the first risk adjustment unit P404 sets the second risk adjustment gain G20 to be a relatively small value (for example, a value between 0~1), and multiplies the second risk RS2_K3 by this second risk adjustment gain G20.

Additionally, the device may be configured so that the first risk RS 1_K 3 may be adjusted to a larger value, and the second risk RS2_K3 may be adjusted to a smaller value, the greater the degree to which the vehicle 1 is attempting to park in a planned parking place. Hereby, the determination of whether or not to execute a warning or vehicle control can be more appropriately carried out in accordance with the parking state of the vehicle 1.

Here, in the present embodiment, the first risk adjustment unit P404 adjusts both the first and second risks RS1_K3, RS2_K3, without being particularly limited to this, either of only one risk may be adjusted. For example, the adjustment may be made so that the second risk R S2_K-3 only is adjusted without adjusting the first risk RS one_K-3. Or otherwise, the first risk RS1_K-3 may be adjusted to be larger while not adjusting the second risk RS2_K3.

Whereas, when the parking state determination unit P109 determines that the vehicle is in the exit state, the first risk adjustment unit P404 adjusts the first risk RS1_K-3 to be smaller and adjusts the second risk RS2_K3 to be larger so that the warning for alerting the driver to the presence of a remote obstacle 19 is preferentially carried out versus the warning to alert the driver of the presence of a nearby obstacle 18.

In other words, in the present embodiment when it is determined that the vehicle 1 is in the exit states, that P4X4 sets the first risk adjustment gain G10 to a relatively small value (for example, a value between 0~1), and multiplies the first risk RS1_K3 by this first risk adjustment gain G10. Further, in this case the first risk adjustment unit P404 sets the second risk adjustment again G20 to a relatively large value (for example, a value greater than or equal to 1), and multiplies the second risk RS2_K3 by this second risk adjustment again G20.

Additionally, the first risk RS1_K3 is adjusted to be smaller and the second risk RS2_K3 is adjusted to be larger, the larger degree to which the vehicle 1 is exiting the parking place. Hereby, the determination of whether or not to execute a warning or vehicle control can be more appropriately carried out in accordance with the parking states of the vehicle 1.

Moreover, in the present embodiment, although the first risk adjustment unit P404 adjusts both the first and second risks RS1_K3, RS2_K3, without being limited to this, either of only one may be adjusted. For example, the device may be configured so that only the second risk RS3_K3 is adjusted without adjusting the first risk RS1_K3. Alternatively, the first risk RS1_K3 may be adjusted to be smaller without adjusting the second risk RS2_K3.

Furthermore, although the description has been omitted, the risk adjustment with respect to the first risk RS1_K1, RS1_K2, RS1_K4 may also be carried out in the same manner as above, and the risk adjustment with respect to the second risk RS2_K1, RS2_K2, RS2_K4, RS3_K1, RS3_K2, RS3_K3, RS3_K4 may also be carried out in the same manner as above.

As illustrated in FIG. 14, when an obstacle 18*a* different from the nearby obstacle 18 that is detected by the nearby obstacle detection device 11 enters between the nearby obstacle 18 and the vehicle 1, the priority control determination unit P404 outputs a signal for executing vehicle control such as executing a warning to alert the driver to the presence of an obstacle 18*a* or generating a braking force, to the brake control operation determination unit P5, the accelerator pedal actuation reaction force determination unit P7, the alarm determination unit P9 and the driving force control determination unit P11.

Here, in the present embodiment, determination of the entry of the obstacle 18*a* may be carried out in the following manner. That is, when the vehicle 1 moves close to the nearby obstacle 18, the distance between both the vehicle 1 and the nearby obstacle 18 calculated by the controller 2 (the nearby relative distance calculation unit P201) becomes gradually shorter.

In this case, if an obstacle 18*a* enters between the vehicle 1 and the nearby obstacle 18 near from the side of the vehicle 1, as illustrated in FIG. 15 the sensing distance suddenly becomes shorter because the nearby obstacle detection device 11 senses the obstacle 18*a*. Thus, the dotted line in the drawing illustrates a case where the variation in the sensing distance when the obstacle to 18*a* has not entered between the vehicle 1 and the nearby obstacle 18. Further, even if the vehicle 1 does not detect a nearby obstacle 18, the sensing distance would be suddenly changed by the obstacle 18*a* suddenly appearing from the side of the vehicle 1.

In the present embodiment, detects the entry of an obstacle 18*a* is detected based on such a sudden change in the sensing distance. For example, if the sensing distance is shorter than a predetermined value (for example, 1.5 m), and the difference between a previously sensed sensing distance (the sensing distance a few seconds before, or the sensing distance the controller 2 calculated in one cycle before), and the present sensing distance is no less than a predetermined value (for example, 20 cm), this is determined as the entry of an the obstacle 18*a*.

In this manner, when the priority determination unit P404 determines that an obstacle 18*a* has entered, the priority determination unit P404 places the priority on executing a warning or vehicle control regarding the obstacle 18*a* that entered versus executing a warning or vehicle control based on the first and second risks. Moreover, the priority determination unit P404 outputs a signal that causes the execution of a warning or vehicle control regarding the entered obstacle 18*a* even in the case that a warning or vehicle control was not to be executed based on the first and second risks.

As illustrated in FIG. 16, even in the case when an obstacle 18*b* is actively approaching the vehicle 1, in the same manner as the above where the obstacle 18*a* entered, the priority control determination unit P404 will output a signal to the brake control operation determination unit P5, the accelerator pedal actuation reaction force determination unit P7, the alarm determination unit P9, and the driving force control determination unit P11 causing the execution of a warning or vehicle control regarding the approaching obstacle 18*b*.

Here, in the present embodiment, the approach of the obstacle 18*b* is detected in the following manner. That is, when the vehicle 1 is moving towards an obstacle 18 that is stopped, the sensing distance shortens by the distance progressed in accordance with the speed of the vehicle 1.

On the other hand, in addition to the vehicle 1 moving toward the obstacle 18*b*, when the obstacle 18*b* is also moving toward the vehicle 1, as illustrated in FIG. 17, the sensing distance becomes shorter than the distance progressed in accordance with the vehicle speed. The dotted line in the same drawing illustrates the variation in the sensing distance when the obstacle 18*b* has hypothetically stopped temporarily.

The approach of the obstacle 18*b* is detected in the present embodiment based on such a variation in the sensing distance. To explain in further detail, the obstacle 18*b* may be determined as approaching the vehicle 1 when the difference between the sensing distance and the travel distance in accordance with the vehicle speed is no less than a predetermined (for example, 15 cm). Alternatively, the difference may be time differentiated to calculate the speed of the obstacle 18*b*, and the obstacle 18*b* is determined as approaching the vehicle 1 when the calculated speed is no less than a predetermined value (1.5 km/h).

In this manner, when the priority determination unit P404 determines that the obstacle 18*b* is approaching, the priority determination unit P404 may output a signal that causes the execution of a warning or vehicle control regarding the approaching obstacle 18*b* versus the execution of a warning or vehicle control based on the first and second risks. Moreover, even if a warning or vehicle control based on the first and second risks is not executed temporarily, the priority determination unit P404 will output a signal that causes the execution of a warning or vehicle control regarding the approaching obstacle 18*b*.

Next, returning to FIG. 2, the brake control operation determination unit P5 and so forth will now be described.

The brake control operation determination unit P5 outputs a signal for executing brake control to the brake control unit P6 when the first risk RS1_K1_G10 (distance value) computed by the first risk computing unit P401, and adjusted by the first risk adjustment unit P403 is larger than the sensing distance LL1 (RS1_K1_G10>LL1) in the nearby obstacle detection device 11 causing the execution of brake control (here, the sensing distance LL1 will be used as reference in this explanation).

Moreover, "brake control" as referred here, means controlling the brake pressure.

The brake control operation determination unit P5 additionally outputs a signal for executing brake control to the brake control unit P6 when the second risk RS2_K1_G20 (distance value) computed by the second risk computing unit P402 and adjusted but the first risk adjustment unit P403 is larger than the sensing distance LF (RS2_K1_G20>LF) in the remote obstacle detection device 12.

Finally, the brake control operation determination unit P5 outputs a signal for executing brake control to the brake control unit P6 when the second risk RS3_K1_G20 (time value) computed by the second risk computing unit P402 and adjusted but the first risk adjustment unit P403 is greater than a Tim To collision (TTC)(RS3_K1_G20>TTC). Further, the TTC can be calculated using the following formula (1).

$$TTC = \text{sensing distance/relative speed} \quad (1)$$

The sensing distance in the above mentioned formula (1) is the sensing distance in the remove obstacle detection device 12, and the relative speed is the relative speed of the vehicle 1 in relation to the remote obstacle 19.

Once the above mentioned signal has been obtained from the brake control operation determination unit P5, the brake control unit P6 increases the brake pressure by a predetermined rate of change, and when a predetermined brake pressure is reached, controls the brake force generator 14 to maintain that brake pressure.

Once the predetermined brake pressure has been maintained for a predetermined time (for example, 0.8 seconds), or once the a predetermined time passes after the vehicle 1 has stopped, the brake control unit P6 controls the brake force generator 14 to reduce the brake pressure to zero using a predetermined rate of change. The above mentioned predetermined brake pressure, predetermined time, and predetermined rate of change may change in accordance with the speed of the vehicle 1, or the distance from the vehicle 1 to the obstacle 18, 19.

Moreover, when the brake control operation determination unit P5 determines that brake control is necessary based on both the first risk RS1_K1_G10, and the second risk RS2_K1_G20, RS3_K1_G20, the brake control unit P6 preferentially executes brake control based on the first risk RS1_K1_G10.

The accelerator pedal actuation reaction force determination unit P7 outputs a signal for executing accelerator pedal actuation reaction force control to the accelerator pedal actuation reaction force control unit P8 when the first risk RS1_K2_G10 computed by the above mentioned P401, and adjusted by the first risk adjustment unit P403 is greater than the sensing distance LL1 (RS1_K2_G10>LL1) in the nearby obstacle detection device 11 (the sensing distance LL1 will be used as reference in this explanation).

Additionally, the accelerator pedal actuation reaction force determination unit P7 outputs a signal for executing accelerator pedal actuation reaction force control to the accelerator pedal actuation reaction force control unit P8 when the second risk RS2_K2_G20 computed by the second risk computing unit P402, and adjusted by the first risk adjustment unit P403 is larger than the sensing distance LF (RS2_K2_G20>LF) in the remote obstacle detection device 12.

Moreover, the accelerator pedal actuation reaction force determination unit P7 outputs a signal for executing accelerator pedal actuation reaction force control to the accelerator pedal actuation reaction force control unit P8 when the second risk RS3_K2_G20 computed by the second risk computing unit P402 and adjusted by the first risk adjustment unit P403 is larger than the TTC (RS3_K2_G20>TTC).

Once the above mentioned signal has been obtained from the accelerator pedal actuation reaction force determination unit P7, and the driver is pressing the accelerator pedal, the accelerator pedal actuation reaction force control unit P8 controls the accelerator pedal reaction force generator 15 to increase the reaction force of the accelerator pedal by a predetermined rate of change.

Once the accelerator pedal reaction force reaches the value based on the predetermined reaction force command value, the accelerator pedal actuation reaction force control unit P8 controls the accelerator pedal reaction force generator 15 to maintain that state. Thereafter, after a predetermined time has passed (for example, 0.8 seconds), the accelerator pedal actuation reaction force control unit P8 reduces the reaction force command value of the accelerator pedal to zero by a predetermined rate of change. Additionally, the reaction force command vale, the predetermined time, and the predetermined rate of change may be changed in accordance with the speed of the vehicle 1, or the distance from the vehicle 1 to the obstacle 18, 19.

Finally, when the accelerator pedal actuation reaction force determination unit P7 determines that the accelerator pedal actuation reaction force control is necessary based on both the first risk RS1_K2_G10, and the second risk RS2_K2_G20, RS3_K2_G20, the accelerator pedal actuation reaction force control unit P8 preferentially executes the accelerator pedal actuation reaction force control based on based on the first risk RS1_K2_G10.

The alarm determination unit P9 outputs a signal for the alarm device 16 to issue a warning to the alarm control determination unit P10 when the first risk RS1_K3_G10 computed by the first risk computing unit P401 and adjusted by the first risk adjustment unit P403 is larger than the sensing distance LL1 (RS1_K3_G10>LL1) in the nearby obstacle detection device 11 (the sensing distance LL1 will be used as reference in this explanation).

the alarm determination unit P9 additionally outputs a signal for the alarm device 16 to issue a warning to the alarm control determination unit P10 when the second risk RS2_K3_G20 is larger than the sensing distance LF in the remote obstacle detection device 12 (RS2_K3_G20>LF).

Further, the alarm determination unit P9 outputs a signal for the alarm device 16 to issue a warning to the alarm control determination unit P10 when the second risk RS3_K3_G20 computed by the second risk computing unit P402 and adjusted by the first risk adjustment unit P403 is larger than the TTC (RS3_K3_G20>TTC).

Once the above mentioned signal is acquired, the alarm control determination unit P10 repeatedly outputs a signal that turns a warning sound or a light on or off. If the alarm device 16 is a buzzer, the alarm control determination unit P10 may output a signal to shorten the interval for turning on the buzzer in accordance with the vehicle 1 and the obstacle 18, 19 approaching each other. In other words, when the obstacle 18, 19 is away from the vehicle 1, the buzzer can be made to emit an intermittent sound such as "beep, beep, beep", and made to emit a continuous sound such as a "beeeep" when the obstacle 18, 19 come closer to the vehicle 1. Hereby, the driver can be alerted to the approach of the obstacle 18, 19 through the auditory sense. Furthermore, different types of warning sounds may be used as the warning for the nearby obstacle 18, and the warning for the remote obstacle 19.

Finally, when the alarm determination unit P9 determines that a warning based on both the first risk RS1_K3_G10 and the second risk RS2_K3_G20 is necessary, the alarm control unit P10 may preferentially execute a warning based on the first risk RS1_K3_G10.

The driving force control determination unit P11 outputs a signal for executing driving force control to the driving force control unit P12 when the first risk RS1_K4_G10 computed by the first risk computing unit P401 and adjusted by the first risk adjustment unit P403 is larger than the sensing distance LL1 (RS1_K4_G10>LL1) in the nearby obstacle detection device 11 (the sensing distance LL1 will be used as reference in this explanation).

The driving force control determination unit P11 additionally outputs a signal for executing driving force control to the driving force control unit P12 when the second risk RS2_K4_G20 computed by the second risk computing unit P402 and adjusted by the first risk adjustment unit P403 is larger than the sensing distance LF (RS2_K4_G20>LF) in the remote obstacle detection device 12.

Moreover, the driving force control determination unit P11 outputs a signal for executing driving force control to the driving force control unit P12 when the second risk RS3_K4_G20 computed by the second risk computing unit P402 and adjusted by the first risk adjustment unit P403 is larger than the TCC (RS3_K4_G20>TCC).

Once the above mentioned signal is acquired from the driving force control determination unit P11, the driving force control unit P12 executes the following kind of control for the driving force generator 13. That is, the driving force control unit P12 controls the driving force generator 13 to compute a reduction amount for the accelerator position, reduce the accelerator position to a predetermined value using a predetermined rate of change, maintain that state for a predetermined time, thereafter restore the accelerator position to an initial state, and bring about the throttle position represented by the following formula (2). The above mentioned reduction amount for the accelerator opening degree, the predetermined rate of change and predetermined time may be varied in accordance with the speed of the vehicle 1, or the distance from the vehicle 1 to the obstacle 18, 19.

The final throttle position=(accelerator position due to driver operation)−(computed reduction amount for accelerator position) (2)

Finally, when the driving force control determination unit P11 determines that driving force control based on both the first risk RS1_K4_G10 and the second risk RS2_K4_G20 is necessary, the driving force control unit P12 may preferentially execute control based on the first risk RS1_K4_G10.

Here, as illustrated in FIG. 2, the vehicle control device 100 in the present embodiment is constituted by the above described controller 2, the nearby obstacle detection device 11, the remote obstacle detection device 12, the driving force generator 13, the brake force generator 14, the accelerator pedal reaction force generator 15, and the alarm device 16.

Next, the control procedures in the vehicle control device 100 in the present embodiment will be described with reference to FIG. 18.

Figure 18:
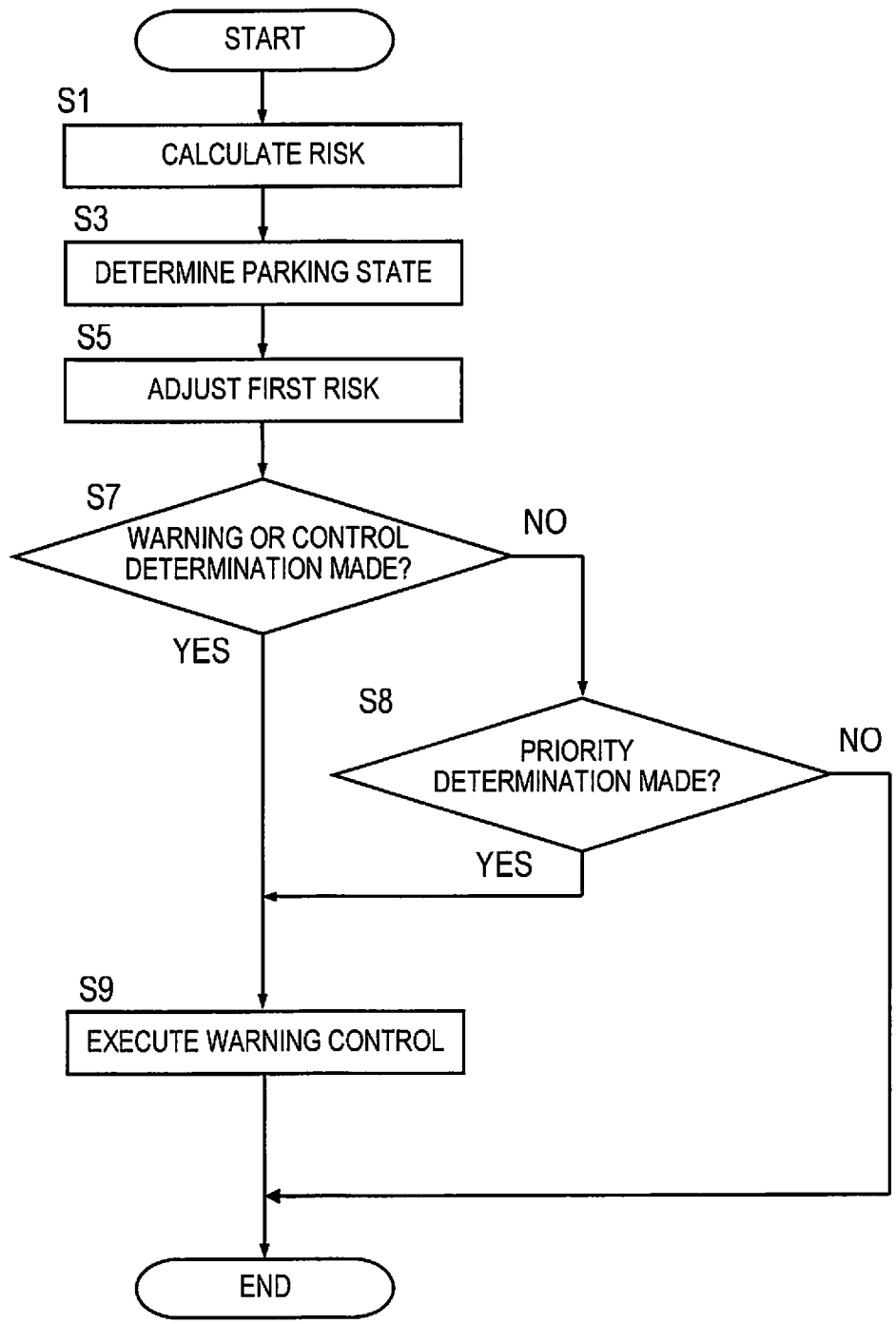
FIG. 18 is a flow chart illustrating a control procedure in the vehicle control device according to the first embodiment of the present invention.

FIG. 18 is a flow chart illustrating a control procedure in the vehicle control device 100 in the present embodiment.

In the flow chart in FIG. 18, in step S1 the controller 2 (the first and second risk calculation units P401, P402) calculate the first risk RS1_K1, RS1_K2, RS1_K3, RS1_K4, and calculate the second risk RS2_K1, RS2_K2, RS2_K3, RS2_K4, RS3_K1, RS3_K2, RS3_K3, RS3_K4.

Next, in step S3, the controller 2 (the parking state determination unit P109) determines whether the vehicle 1 is in the state of entering a planned parking place, or in the state of exiting a parking place.

Next, in step S5, the controller 2 (the first risk adjustment unit P403) carries out risk adjustment. For example, in step S3, if it is determined that the vehicle 1 is in the entry state, the first risk RS1_K3 is multiplied by a relatively large risk adjustment gain G10, and the second risk RS2_K3 is multiplied by a relatively small risk adjustment gain G20 (G10>G20). Here, the first and second risks RS1_K3, RS2_K3 will be used as a reference in this explanation. Additionally, as above described, only either of only one of the first risk or the second risk may be subject to risk adjustment, while the other of the first risk or the second risk is not subject to risk adjustment.

Next, in step S7, the controller 2 (the brake control operation determination unit P5, the accelerator pedal actuation reaction force determination unit P7, the alarm determination unit P9, and the driving force control determination unit P11) determine whether or not to execute a warning or vehicle control. In step S7, if it is determined that a warning or vehicle control is to be executed, the control continues to step S9.

Whereas, if it is determined that a warning or vehicle control will not be executed, the control continues to step S8.

In step S8, determinations are made regarding the presence or absence of a different obstacle 18a that has entered between the nearby obstacle 18 and the vehicle 1, or the presence or absence of an obstacle 18b that is approaching the vehicle 1.

If it is determined in step S8 that this kind of obstacle 18a, 18b is present, the control continues to step S9, and if it is determined that this kind of obstacle 18a, 18b does not exist, the control in the vehicle control device 100 ends.

In step S9 a warning is executed to alert the driver of the presence of the obstacle 18, 19, or vehicle control such as brake force control is executed.

Here, in the present embodiment, the coefficients K1~K4 employed by the first and second risk calculation units P401, P402 are larger in the order of K1, K2, K4, K3 (K1≤K2≤K4≤K3), and therefore the vehicle 1 is controlled in the order of a warning by the alarm device 16, deceleration by the driving force generator 13 (deceleration due to the reduced accelerator opening degree), generation of reaction force on the accelerator pedal by the accelerator pedal reaction force generator 15, and deceleration by the brake force generator 14 (deceleration due to increased braking pressure).

Additionally, in the present embodiment, if it is determined in step S7 that a warning or vehicle control will not be executed, the control continues to step S8; however, without being limited to this, the device may be configured such that the control continues to step S8 even when it its determined that a warning or vehicle control will be executed.

In this case, the vehicle 1 may be controlled in the order of a warning by the alarm device 16, deceleration by the driving force generator 13, generation of reaction force on the accelerator pedal by the accelerator pedal reaction force generator 15, and deceleration by the brake force generator 14 in accordance with the obstacle 18, 19 and the vehicle 1 approaching each other.

In the above manner, the present embodiment calculates a first risk (base) representing the possibility that the vehicle will contact a nearby obstacle, and a second risk (base) representing the possibility that the vehicle will contact a remote obstacle; and based on a state where the vehicle is entering a planned parking place, or a state where the vehicle is exiting a parking position, the present embodiment adjusts the first risk and the second risk to preferentially execute a warning or vehicle control based on one of the first risk or the second risk with respect to a warning or vehicle control based on the other of the first risk or the second risk. In other words, in the present embodiment, the priority for a warning or vehicle control is low for an obstacle with low possibility of contacting the vehicle, and the priority for a warning or vehicle control is high for an obstacle with a high possibility of contacting the vehicle.

Hereby, with the present embodiment it is possible to appropriately execute a warning with respect to an obstacle that requires the driver's attention, or execute the appropriate vehicle control to avoid contacting that obstacle while suppressing unneeded warnings or vehicle control, to thereby reduce the stress put on the driver.

Additionally, in the present embodiment, the vehicle is controlled in the order of a warning by the alarm device, deceleration by the driving force generator (deceleration by reducing the accelerator opening degree), generation of reaction force on the accelerator pedal by the accelerator pedal reaction force generator, and deceleration by the brake force generator (deceleration by increasing the braking pressure). That is, before executing vehicle control a warning is certainly sound, and thus the driver is alerted to the possibility of the execution of vehicle control via the warning. Hereby, it is possible to suppress the stress associated with the sudden execution of vehicle control from being put on the driver.

Moreover, in the present embodiment, it is possible to ensure that the driver will voluntarily attempt to avoid contact with the obstacle before deceleration due to increased braking pressure by controlling the vehicle in the order of deceleration by the driving force generator (deceleration by reducing the accelerator opening degree), generation of reaction force on the accelerator pedal by the accelerator pedal reaction force generator, and deceleration by the brake force generator (deceleration by increasing the braking pressure). Thus, suppressing the stress associated with unintended and sudden braking from being put on the driver.

Additionally, in the present embodiment, the determination of whether or not to execute a warning or vehicle control is made based on a risk indicative of the possibility that the vehicle and the obstacle will come in contact, and therefore even if there is a nearby obstacle near the vehicle, in a case where a far-off fast-approaching remote obstacle is detected, it is still possible to execute a warning or vehicle control with respect to the remote obstacle. Hereby, it is possible to provide the appropriate warning or vehicle control that prompts the driver to recognize the latent risk of a remote obstacle.

Furthermore, in the present embodiment, when the entering of a different obstacle is detected, a warning or vehicle control may be preferentially executed for the entering obstacle, and therefore it is possible for the driver to reliably identify the entering object.

Finally, in the present embodiment, the nearby obstacle detection device 11 on the rear side 1a was used when determining whether or not the vehicle 1 was in an exiting state from reverse, however, at this point, the nearby obstacle detection device 11 on the front side 1b or the remote obstacle detection device 12 may be used to detect an obstacle located at the front side of the vehicle 1, and a warning and so forth may be executed for the detected obstacle. This can hereby draw the driver's attention to an obstacle located on the side opposite to the traveling direction (in the present example the reversing direction).

Second Embodiment

Figure 19:
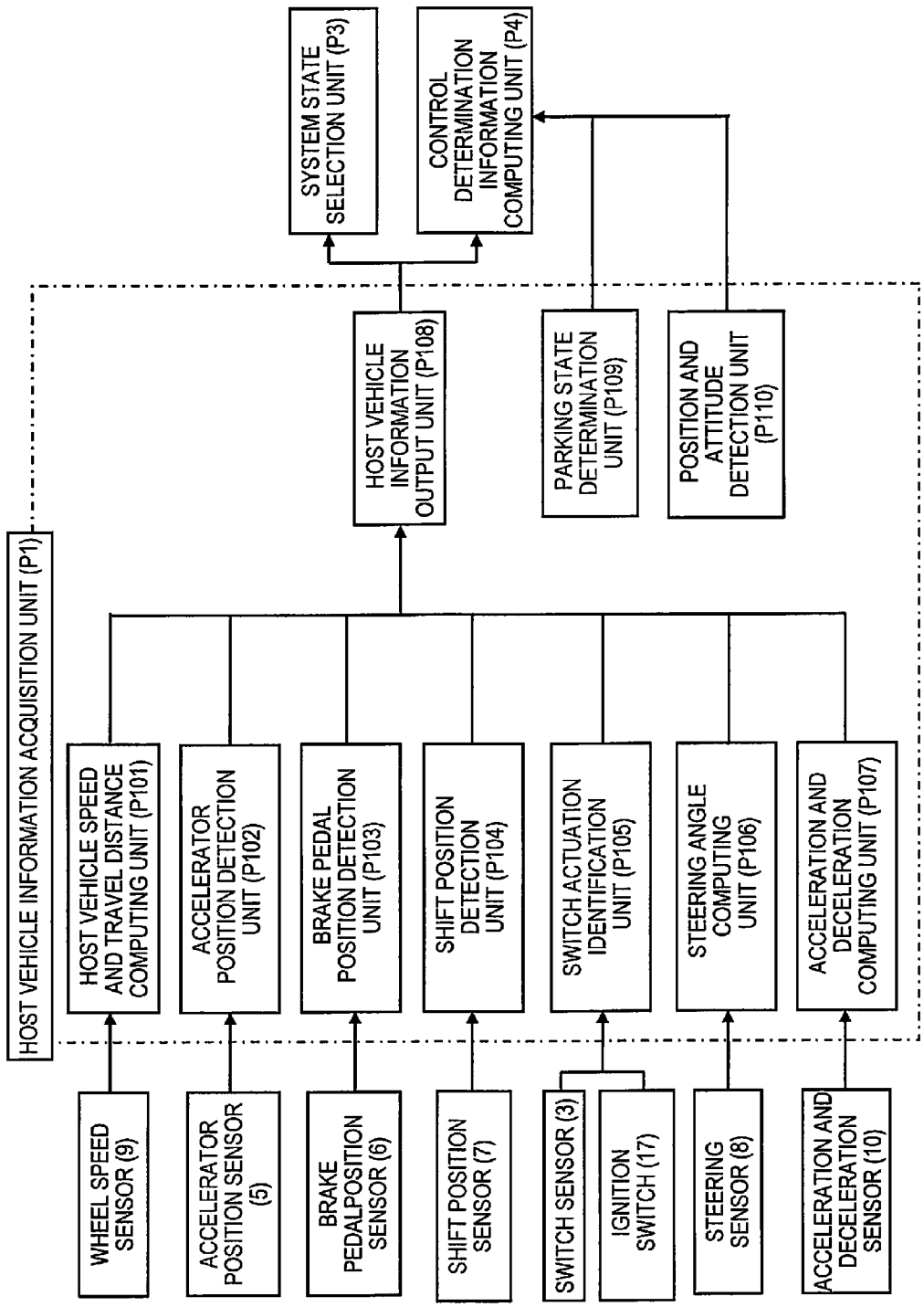
FIG. 19 is a block diagram of a host vehicle information acquisition unit according to a second embodiment of the present invention.
Figure 20:
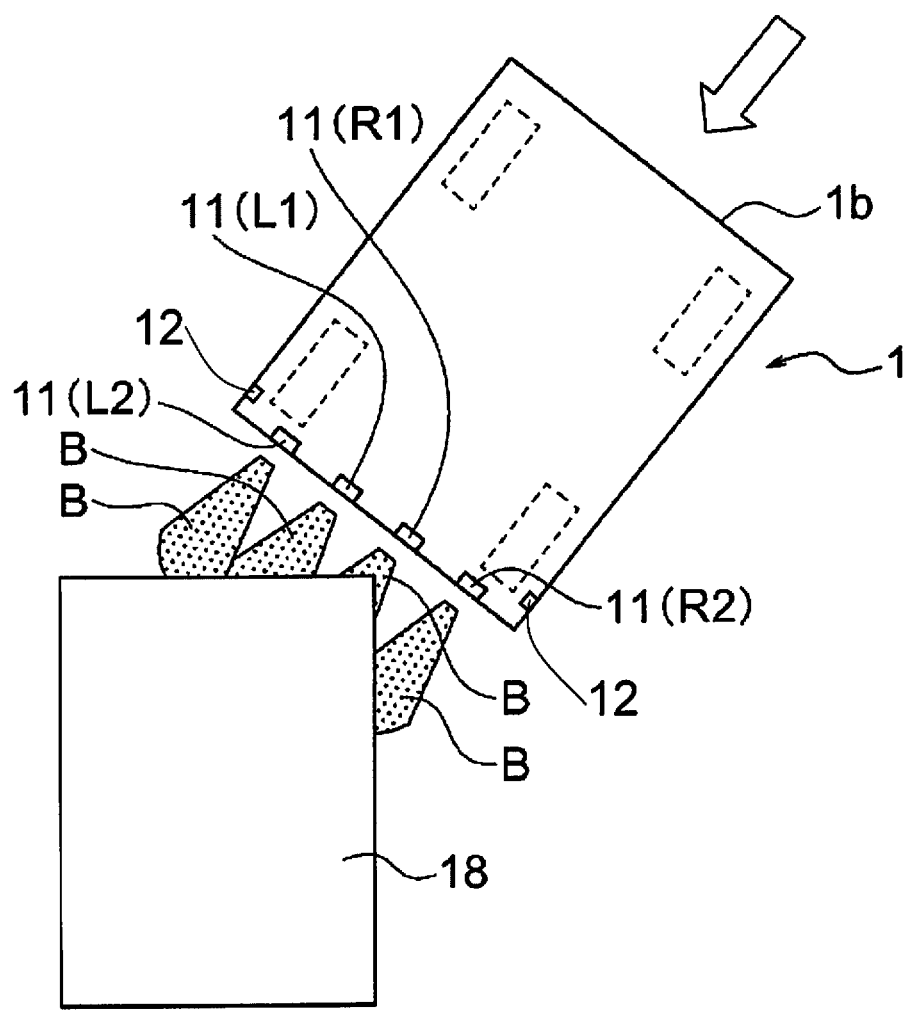
FIG. 20 is a diagram for explaining the operation of a position and attitude detection unit in the second embodiment of the present invention (Example 1).
Figure 21:
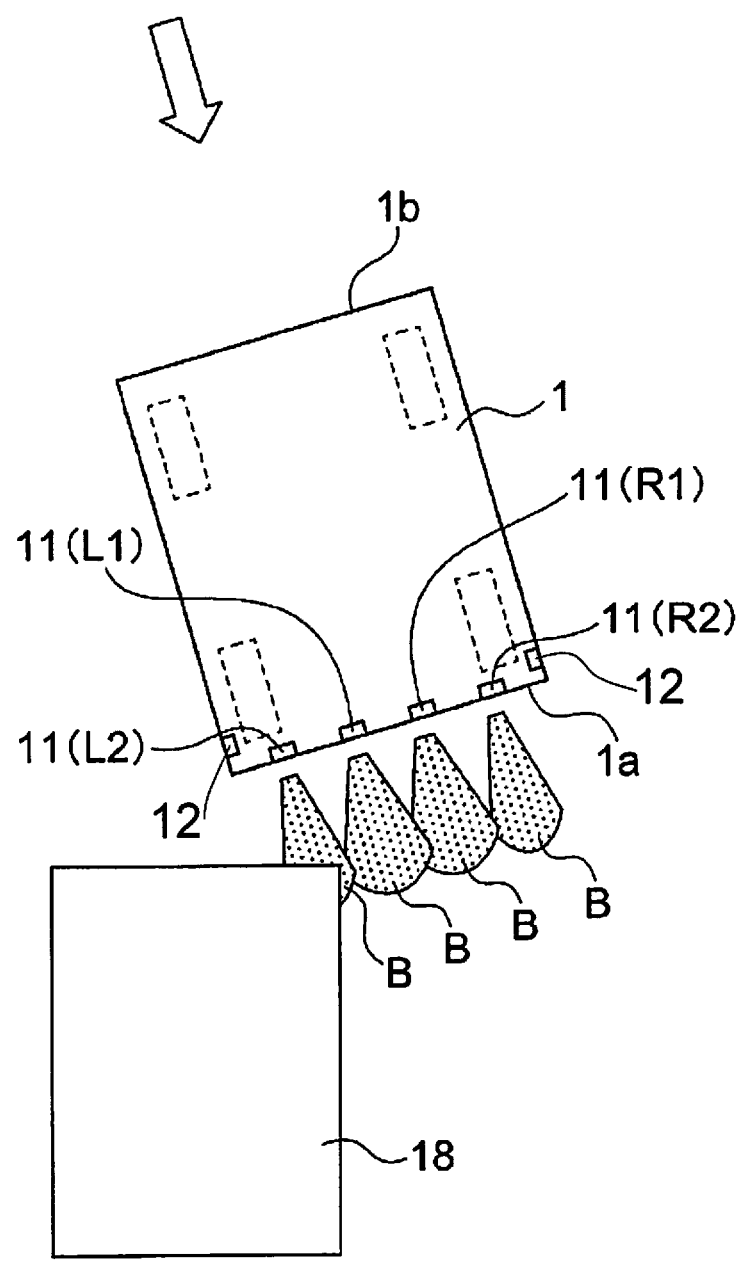
FIG. 21 is a diagram for explaining the operation of the position and attitude detection unit in the second embodiment of the present invention (Example 2).
Figure 22:
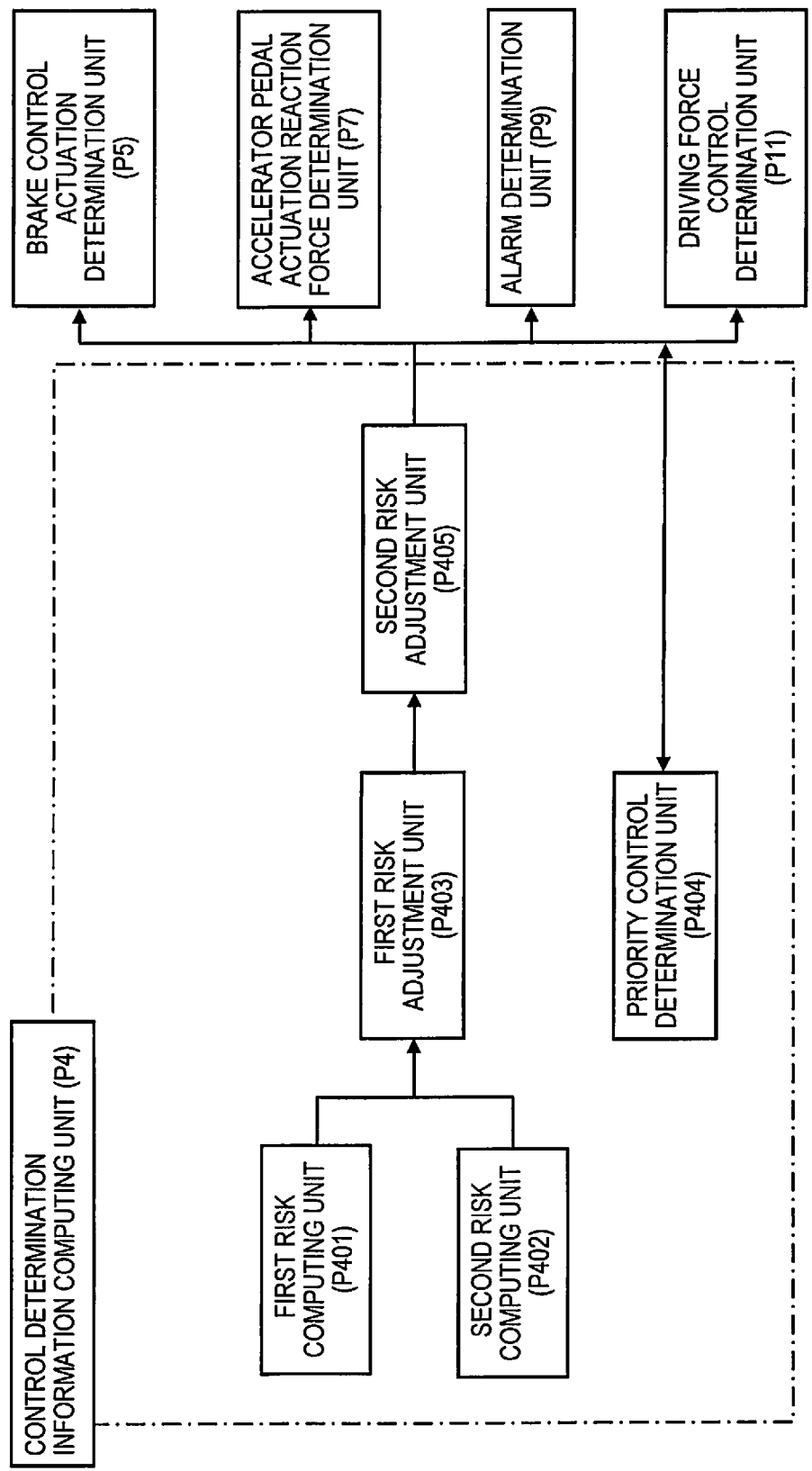
FIG. 22 is a block diagram of a control determination information computing unit according to the second embodiment of the present invention.
Figure 23:
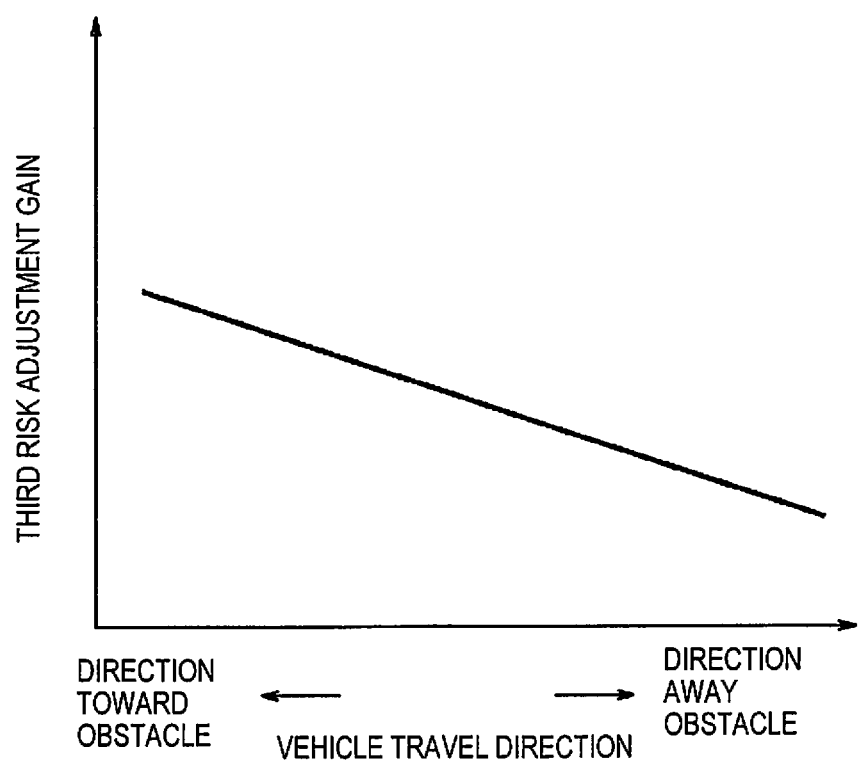
FIG. 23 is a graph for explaining a third risk adjustment gain in the second embodiment of the present invention.
Figure 24:
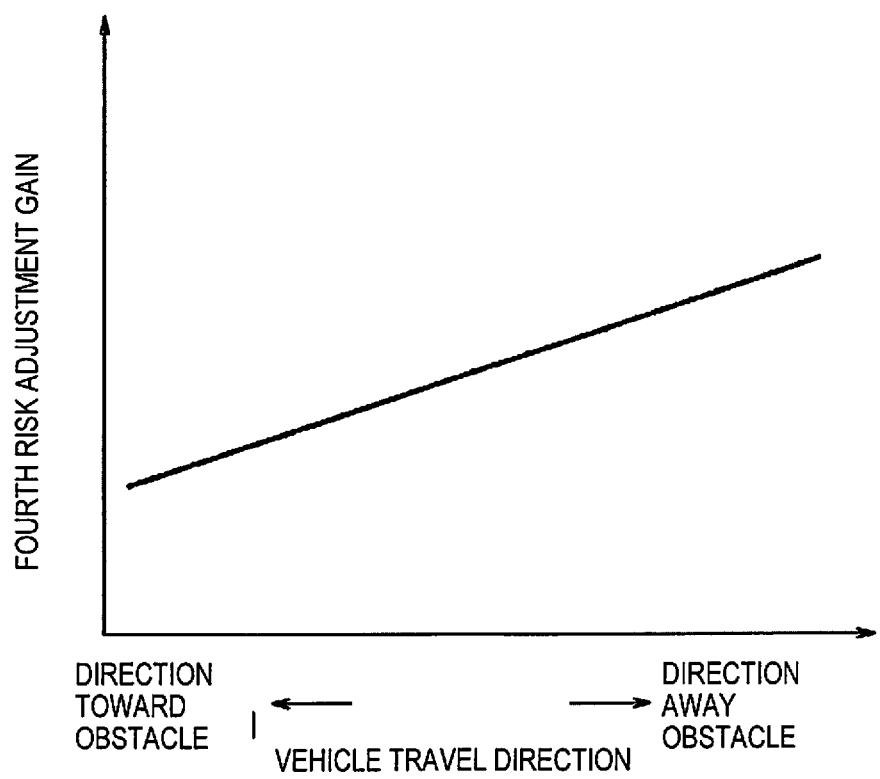
FIG. 24 is a graph for explaining a fourth risk adjustment gain in the second embodiment of the present invention.

FIG. 19 is a block diagram of the host vehicle information acquisition unit in the present embodiment; FIG. 20 and FIG. 21 are diagrams for explaining the operation of the position and attitude detection unit in the present embodiment; FIG. 22 is a block diagram of the control determination information computing unit in the present embodiment; FIG. 23 is a graph for explaining the third risk gain in the present embodiment; and FIG. 24 is a graph for explaining a fourth risk gain in the present embodiment.

In the present embodiment, although the configuration of the host vehicle information acquisition unit P1 and the control determination information computing unit P4 in the controller 2 differs from the first embodiment, all other aspects are the same as the first embodiment. Only those portions that differ from the first embodiment will be described below, while portions that are the same as the first embodiment will be given the same reference numerals with the explanations omitted.

As illustrated in FIG. 19, the host vehicle information acquisition unit P1 in the controller 2 in the present embodiment has a position and attitude detection unit P110 that detects the position and the attitude of the vehicle 1 with respect to the nearby obstacle 18.

As illustrated in FIG. 20 and FIG. 21, for example the position and attitude detection unit P110 may estimate the orientation of the traveling direction of the vehicle 1 with respect to the nearby obstacle 18 using the detection results for the nearby obstacle from the nearby obstacle detection device 11. More specifically, as illustrated in FIG. 20, when all of the nearby obstacle detection devices 11 (L2),(L1), (R1),(R2) detect a nearby obstacle 18, the position and attitude detection unit P110 estimates that the traveling direction of the vehicle 1 is toward the nearby obstacle 18. Here, the concept of the traveling direction is not only the forward travel direction, but also includes the reverse direction. Furthermore, FIG. 20, and FIG. 21 illustrate the situation where the vehicle is approaching the nearby obstacle 18 while traveling in reverse.

Whereas, as illustrated in FIG. 21, when only the nearby obstacle detection device 11 (L2) detects the nearby obstacle 18, and the nearby obstacle detection devices 11 (L1), (R1), (R2) do not detect the nearby obstacle 18, the position and attitude detection unit P110 estimates that the traveling direction of the vehicle 1 is oriented away from the nearby obstacle 18.

The position and attitude detection unit P110 outputs the estimation results for the traveling direction of the vehicle 1 to the second risk adjustment unit P405 (later described).

In the present embodiment, although as above mentioned, the obstacle detection sensor 11 estimates orientation of the traveling direction of the vehicle 1 in relation to the nearby obstacle 18, the method for estimating the orientation of the traveling direction of the vehicle 1 is not particularly limited. For example, a camera may be provided on the vehicle to take an image of the periphery of the vehicle 1, and the orientation of the traveling direction of the vehicle 1 in relation to the nearby obstacle 18 may be computed using image processing.

Additionally, as illustrated in FIG. 22, the control determination information computing unit P4 in the present embodiment, has a P405.

The second risk adjustment unit P405 adjusts the first and second risks adjusted by the first risk adjustment unit P403 based on the orientation of the traveling direction of the vehicle estimated by the position and attitude detection unit P110.

More specifically, when the traveling direction the vehicle 1 is the direction toward the nearby obstacle 18, the first risk RS1_K1_G10, RS1_K2_G10, RS1_K3_G10, RS1_K4_G10 (the reference numerals are omitted and is simply called the first risk below) is adjusted to be larger and the second risk RS2_K1_G20, RS2_K2_G20, RS2_K3_G20, RS2_K4_G20, RS3_K1_G20, RS3_K2_G20, RS3_K3_G20, RS3_K4_G20 (the reference numerals are omitted and is simply called the second risk below) is adjusted to be smaller.

Whereas, when the traveling direction of the vehicle is a direction away from the nearby obstacle 18, the first risk is adjusted to be smaller and the second risk is adjusted to be larger.

This kind of risk adjustment is carried out in the following manner. That is, the first risk is multiplied by a third risk gain G11, and the second risk is multiplied by a fourth risk gain G21.

The first risk gain G11 is a value corresponding to the orientation of the traveling direction of the vehicle 1. In particular, as illustrated in FIG. 23, the third risk gain G11 which is a multiplier of the first risk is calculated so that the more the traveling direction of the vehicle 1 is oriented toward the direction of the nearby obstacle 18 the larger the third risk gain G11 will be (for example, a value no less than 1 in the situation in FIG. 20), and so that the more the traveling direction of the vehicle 1 is oriented in a direction away from the nearby obstacle 18, the smaller the third risk gain G11 will be (for example, the value between 0~1 in the situation in FIG. 21).

Whereas, as illustrated in FIG. 24, the fourth risk gain G12 which is a multiplier of the second risk is calculated so that the more the traveling direction of the vehicle 1 is oriented in the direction toward the nearby obstacle 18, the smaller the fourth risk gain will be (for example, a value between 0~1 in the situation in FIG. 20), and so that the more the traveling direction of the vehicle 1 is oriented in a direction away from the nearby obstacle 18, the larger the fourth risk gain will be (for example, a value no less than 1 in the situation in FIG. 21).

Next, a simple explanation of the operation procedure in the vehicle control device 100 in the present embodiment will be given.

The operation procedure in the vehicle control device 100 in the present embodiment includes a risk adjustment step S6 carried out by the second risk adjustment unit P405 provided between a risk adjustment step (step 5) carried out by the first risk adjustment unit P403 in the first embodiment, and a priority determination step (step 7) carried out by the priority control determination unit P404. An illustration is omitted from the flow chart.

As above described, in step S6 the first risk is adjusted so that the more the traveling direction of the vehicle 1 is oriented toward the direction the nearby obstacle 18 is oriented, the larger the first risk is adjusted to be and the smaller the second risk is adjusted to be; and the more the traveling direction of the vehicle 1 is in a direction away from the nearby obstacle 18, the smaller the first risk is adjusted to be, and the larger the second risk is adjusted to be.

In the above manner, in the present embodiment, the more the traveling direction of the vehicle is oriented in the direction toward the nearby obstacle, the more likely a warning or vehicle control will be executed based on the first risk, and the more the traveling direction of the vehicle is oriented in a direction away from the nearby obstacle, the more likely a warning or vehicle control will be executed based on the second risk. In the present embodiment, "the more likely a warning or vehicle control will be executed" includes expediting the timing for executing a warning or vehicle control.

Hereby, for example, if the vehicle is moving toward a nearby object while parking and so forth, it is possible to suppress an unreasonable and inappropriate warning or vehicle control where the warning or vehicle control is executed for a remote object for which the possibility of contact is small. Therefore, it is possible to further reduce the amount of stress put on the driver. Moreover, in the present embodiment "to suppress the warning or vehicle control" includes delaying the timing for the warning or vehicle control.

Additionally, in the present embodiment, the first risk adjustment unit adjusts a first and second risk, to reduce the priority level for the warning or vehicle control with respect to an obstacle having a small possibility of contacting the vehicle while increasing the priority level of the warning and vehicle control with respect to an obstacle having a large possibility of contacting the vehicle, therefore it is possible to reduce the amount of stress put on the driver.

Furthermore, in the present embodiment, when the entrance of an obstacle is detected, a warning or vehicle control is preferentially executed with respect to the entering object, and can thereby cause the driver to reliably recognize the entered obstacle.

Additionally in the present embodiment, whether or not to execute a warning or vehicle control is determined based on a risk indicative of the possibility that the vehicle and the obstacle will come into contact, and can thereby allow execution of an appropriate warning or vehicle control.

Further, in the present embodiment, it is possible to suppress the stress associated with sudden vehicle control from being put on the driver, since the vehicle is controlled in the order of a warning by the alarm device, deceleration by the driving force generator (deceleration by reducing the accelerator position), generation of reaction force on the accelerator pedal by the accelerator pedal reaction force generator, and deceleration by the brake force generator (deceleration by increasing the braking pressure).

In the present embodiment, although both the first and second risks may be subject to risk adjustment based on the traveling direction of the vehicle, either of only one of the first risk and second risk may be subject to risk adjustment.

It is possible to obtain the above described effects even with this manner of configuration.

Third Embodiment

Figure 25:
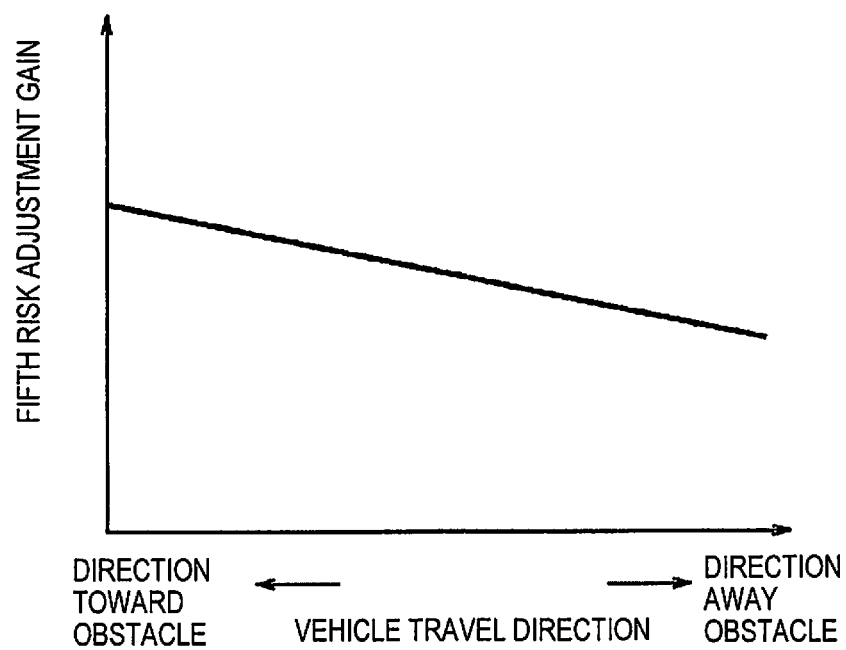
FIG. 25 is a graph for explaining a fifth risk adjustment gain in a third embodiment of the present invention.
Figure 26:
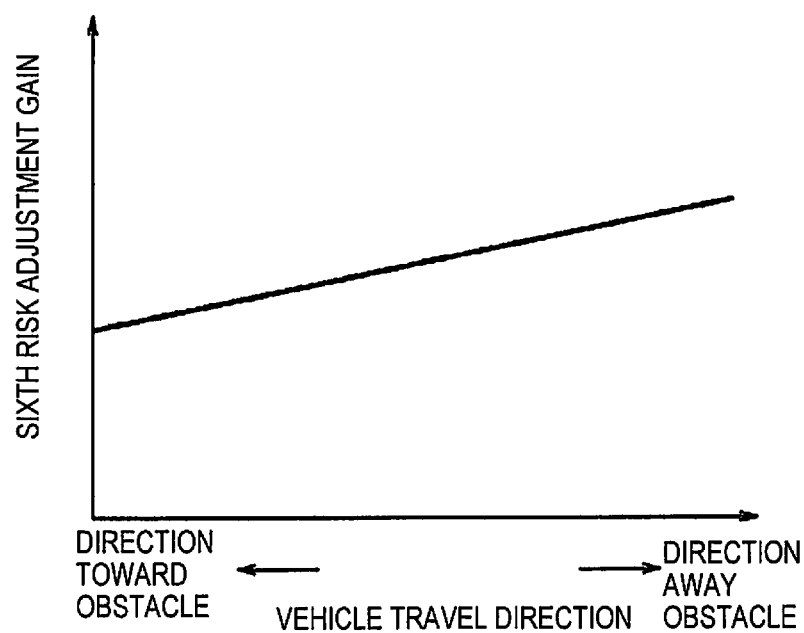
FIG. 26 is a graph for explaining a sixth risk adjustment gain in the third embodiment of the present invention.

FIG. 25 is a graph for explaining the fixed of fifth risk gain in the present embodiment; and FIG. 26 is a graph for explaining a sixth risk gain in the present embodiment.

Although in the present embodiment the configuration of the position and attitude detection unit P110 and the second risk adjustment unit P405 differ from the second embodiment, all other aspects are the same as the second embodiment. That is, the present embodiment is the same as the first embodiment except for the controller 2 having the position and attitude detection unit P110 and the second risk adjustment unit P405. Only the portions that differ from the first and the second embodiments will be described below; the portions that are the same as the first and the second embodiments will be given the same reference numerals, and explanations therefor will be omitted. Additionally, the display of reference numerals regarding the first and second risks will be omitted as with the second embodiment.

The position and attitude detection unit P110 in the present embodiment detects the distance from the vehicle 1 to the nearby obstacle 18. Although in the present embodiment the position and attitude detection unit P110 is provided in the host vehicle information acquisition unit P1 similarly to the second embodiment, without being limited thereto, the nearby relative distance calculation unit P201 in the periphery information acquisition unit P2 may perform the functions of the position and attitude detection unit P110.

Moreover, the second risk adjustment unit P405 in the present embodiment adjusts the risk by multiplying the first risk by the fifth risk gain, and multiplying the second risk by the sixth risk gain.

As illustrated in FIG. 25, the fifth risk gain is calculated to become larger in proportion to the shortness of the distance detected by the above mentioned P110, and to become smaller in proportion to the lengthiness of said distance. For example, when the distance is shorter than a predetermined distance, the fifth risk adjustment gain can be set to a value no less than 1, and when the distance is longer than a predetermined distance, the fifth risk adjustment gain can be set to a value between 0~1.

Whereas, as illustrated in FIG. 26, the sixth risk gain is calculated to become smaller in proportion to the shortness of the distance detected by the above mentioned P110, and to become larger in proportion to the lengthiness of the distance. For example, when the distance is shorter than a predetermined distance, the sixth risk gain can be set to a value between 0~1, and when the distance is longer than a predetermined distance, the sixth risk gain can be set to a value no less than 1.

Next, the operation procedure in the vehicle control device 100 in the present embodiment will be briefly described.

In the same manner as a second embodiment, the operation procedure in the vehicle control device 100 in the present embodiment is provided with a risk adjustment step S6 carried out by the second risk adjustment unit P405, between the risk adjustment step (step S5) carried out by the first risk adjustment unit P403, and the priority determination step (step S7) carried out by the priority control determination unit P404. This illustration is not included in the flowchart.

As above described, in step S6, the shorter the distance from the vehicle 1 to the nearby obstacle 18 the larger the first risk is adjusted to be, and the smaller the second risk is adjusted to be; and the longer the distance from the vehicle 1 to the nearby obstacle 18, the smaller the first risk is adjusted to be and the larger the second risk is adjusted to be.

In the above manner, in the present embodiment, the closer the vehicle comes to the nearby obstacle, the more likely a warning or vehicle control will be executed based on the first risk, and the further away the vehicle is from the nearby obstacle, the more likely a warning or vehicle control will be executed based on the second risk.

In the present embodiment, "the more likely a warning or vehicle control will be executed" includes expediting the timing for executing a warning or vehicle control.

Hereby, for example, if the vehicle is moving toward a nearby object while parking and so forth, it is possible to suppress an unreasonable and inappropriate warning or vehicle control where the warning or vehicle control is executed for a remote object for which the possibility of contact is small. Therefore, it is possible to further reduce the amount of stress put on the driver. Moreover, in the present embodiment "to suppress the warning or vehicle control" includes delaying the timing for the warning or vehicle control.

Additionally, in the present embodiment, the first risk adjustment unit adjusts the first and second risks, to reduce the priority level for the warning or vehicle control with respect to an obstacle having a small possibility of contacting the vehicle while increasing the priority level of the warning and vehicle control with respect to an obstacle having a large possibility of contacting the vehicle, therefore it is possible to reduce the amount of stress put on the driver.

Furthermore, in the present embodiment, when the entrance of an obstacle is detected, a warning or vehicle control is preferentially executed with respect to the entering object, and can thereby cause the driver to reliably recognize the entered obstacle.

Additionally in the present embodiment, whether or not to execute a warning or vehicle control is determined based on a risk indicative of the possibility that the vehicle and the obstacle will come into contact, and can thereby allow execution of an appropriate warning or vehicle control.

Further, in the present embodiment, the vehicle is controlled in the order of a warning by the alarm device, deceleration by the driving force generator (deceleration by reducing the accelerator opening degree), generation of reaction force on the accelerator pedal by the accelerator pedal reaction force generator, and deceleration by the brake force generator (deceleration by increasing the braking pressure), and therefore it is possible to suppress the stress associated with sudden vehicle control from being put on the driver.

In the present embodiment, although both the first and second risks were subject to risk adjustment based on the distance from the vehicle to the nearby obstacle, either of only one of the first risk and second risk may be subject to risk adjustment. It is possible to obtain the above described effects even with this manner of configuration.

Fourth Embodiment

Figure 27:
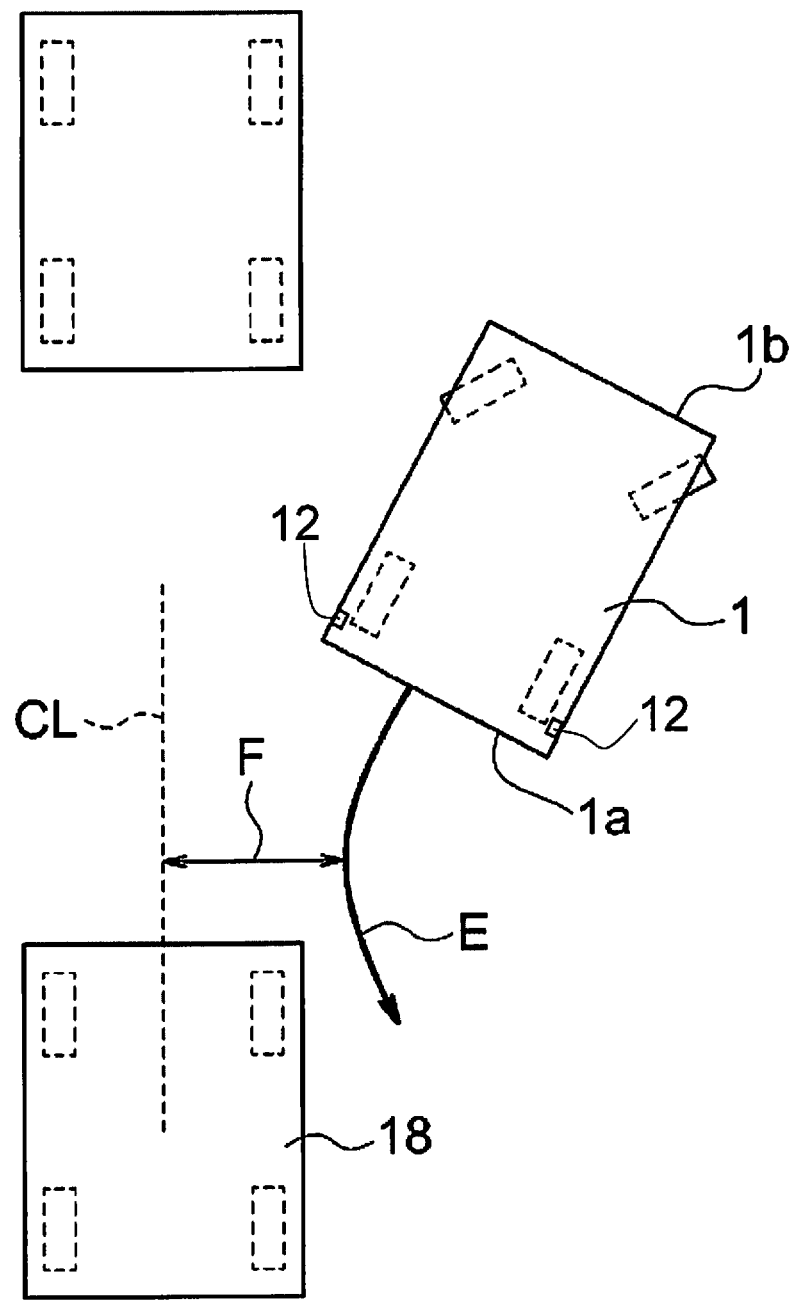
FIG. 27 is a diagram for explaining the functions of a second risk adjustment unit in a fourth embodiment of the present invention.

FIG. 27 is a diagram for explaining the functions of the second risk adjustment unit in the present embodiment.

Although in the present embodiment the configuration of the position and attitude detection unit P110 and the second risk adjustment unit P405 differ from the second embodiment, all other aspects are the same as the second embodiment. That is, in the present embodiment, the present embodiment is the same as the first embodiment except for the controller 2 having the position and attitude detection unit P110 and the second risk adjustment unit P405. Only the portions that differ from the first and the second embodiments will be described below; the portions that are the same as the first and the second embodiments will be given the same reference numerals, and the explanations therefor will be omitted. Additionally, the display of reference numerals regarding the first and second risk will be omitted as with the second embodiment.

As illustrated in FIG. 27, the position and attitude detection unit P110 calculates an estimated travel path E for the vehicle 1 and calculates a distance F between said estimated travel path E and a nearby obstacle 18 (called the estimated distance below) based on the steering angle of the steering wheel computed by the steering angle computing unit P106. Further, the estimated distance F in the present embodiment is the distance between the point closest to the nearby obstacle 18 in the estimated travel path E and a center line CL of the nearby obstacle 18. FIG. 27 illustrates the situation where the vehicle 1 is in reverse.

Furthermore, the second risk adjustment unit P405 in the present embodiment adjusts the risk by multiplying the first risk by the seventh risk gain, and multiplying the second risk by the eighth risk gain.

Similar to the fifth risk gain illustrated in FIG. 25, the seventh risk gain is calculated to become larger in proportion to the shortness of the estimated distance F and to become smaller in proportion to lengthiness of the estimated distance F. For example, when the estimated distance F is shorter than a predetermined distance, the seventh risk gain can be set to a value no less than 1; and when the estimated distance F is longer than a predetermined distance, the seventh risk again can be set to a value between 0 to 1.

Whereas, similar to the sixth risk gain illustrated in FIG. 26, the eighth risk gain is calculated to become smaller in proportion to the shortness of the estimated distance F, and to become larger in proportion to the lengthiness of the estimated distance F. For example, when the estimated distance F is shorter than a predetermined distance, the eighth risk adjustment gain is set to a value between 0~1; and when the estimated distance F is longer than a predetermined distance, the eighth risk gain can be set to no less than 1.

Next, the operation procedure in the vehicle control device 100 in the present embodiment will be briefly described.

In the same manner as a second embodiment, the operation procedure in the vehicle control device 100 in the present embodiment is provided with a risk adjustment step S6 carried out by the second risk adjustment unit P405, between the risk adjustment step (step S5) carried out by the first risk adjustment unit P403, and the priority determination step (step S7) carried out by the priority control determination unit P404. This illustration is not included in the flowchart.

As above described, in step S6, the shorter the estimated distance F the larger the first risk is adjusted to be, and the smaller the second risk is adjusted to be; while the longer the estimated distance F the smaller the first risk is adjusted to be, and the larger the second risk is adjusted to be.

In the above manner, in the present embodiment, the closer the vehicle comes to the nearby obstacle, the more likely a warning or vehicle control will be executed based on the first risk, and the further away the vehicle is from the nearby obstacle, the more likely a warning or vehicle control will be executed based on the second risk. In the present embodiment, "the more likely a warning or vehicle control will be executed" includes expediting the timing for executing a warning or vehicle control.

Hereby, for example, if the vehicle is moving toward a nearby object while parking and so forth, it is possible to suppress unreasonable and inappropriate warning or vehicle control where the warning or vehicle control is executed for a remote object for which the possibility of contact is small. Therefore, it is possible to further reduce the amount of stress put on the driver. Moreover, in the present embodiment "to suppress the warning or vehicle control" includes delaying the timing for the warning or vehicle control.

Additionally, in the present embodiment, the first risk adjustment unit adjusts the first and second risks, to reduce the priority level for the warning or vehicle control with respect to an obstacle having a small possibility of contacting the vehicle while increasing the priority level of the warning and vehicle control with respect to an obstacle having a large possibility of contacting the vehicle, therefore it is possible to reduce the amount of stress put on the driver.

Furthermore, in the present embodiment, when the entrance of an obstacle is detected, a warning or vehicle control is preferentially executed with respect to the entering object, and can thereby cause the driver to reliably recognize the entered obstacle.

Additionally in the present embodiment, whether or not to execute a warning or vehicle control is determined based on a risk indicative of the possibility that the vehicle and the obstacle will come into contact, and can thereby allow execution of an appropriate warning or vehicle control.

Further, in the present embodiment, the vehicle is controlled in the order of a warning by the alarm device, deceleration by the driving force generator (deceleration by reducing the accelerator position), generation of reaction force on the accelerator pedal by the accelerator pedal reaction force generator, and deceleration by the brake force generator (deceleration by increasing the braking pressure), and therefore it is possible to suppress the stress associated with sudden vehicle control from being put on the driver.

In the present embodiment, although both the first and second risks may be subject to risk adjustment based on the distance between the estimated travel path and the nearby obstacle, either of only one of the first risk and second risk may be subject to risk adjustment. It is possible to obtain the above described effects even with this manner of configuration.

Fifth Embodiment

Figure 28:
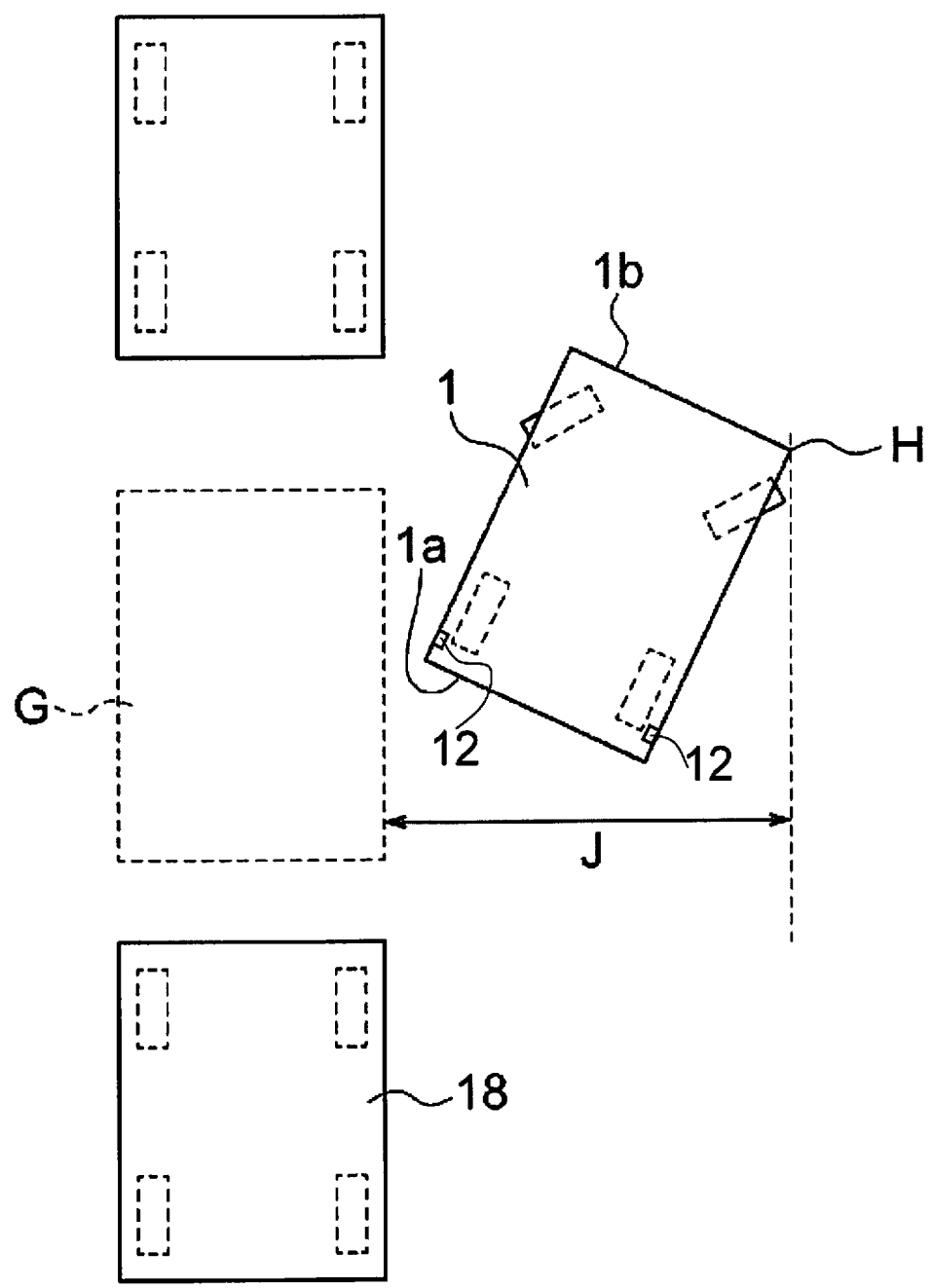
FIG. 28 is a diagram for explaining the operation of a second risk adjustment unit in a fifth embodiment of the present invention.

FIG. 28 is a diagram for explaining the functions of the second risk adjustment unit in the present embodiment.

Although in the present embodiment the configuration of the position and attitude detection unit P110 and the second risk adjustment unit P405 differ from the second embodiment, all other aspects are the same as the second embodiment. That is, in the present embodiment, the present embodiment is the same as the first embodiment except for the controller 2 having the position and attitude detection unit P110 and the second risk adjustment unit P405. Only the portions that differ from the first and the second embodiments will be described below; the portions that are the same as the first and the second embodiments will be given the same reference numerals, and explanations therefor will be omitted. Additionally, the display of reference numerals regarding the first and second risks will be omitted as with the second embodiment.

As illustrated in FIG. 28, the position and attitude detection unit P110 in the present embodiment computes an offset amount J of the distance between a farthest end H of the vehicle 1 from a planned parking place G and the planned parking place G. The offset amount J may be obtained by selecting the end H of the vehicle 1 together with the location G and calculating the distance between the end H and the planned parking place G, when selecting the planned parking place G on a monitor displaying the periphery of the vehicle 1 in a parking guide function that guides the vehicle 1 to the planned parking place G. The parking guide function may be a function in a navigation system (not shown) that is provided to the vehicle 1 in the present embodiment.

Additionally, FIG. 28 illustrates the situation where the vehicle 1 is in reverse.

Moreover, the second risk adjustment unit P405 in the present embodiment adjusts the risk by multiplying the first risk by the ninth risk adjustment gain, and multiplying the second risk by the tenth risk adjustment gain.

Similar to the fifth risk adjustment gain in FIG. 25, the ninth risk adjustment gain is calculated to become larger in proportion to the smallness of the offset amount J, and to become smaller in proportion to the largeness of the offset amount J. For example, when the offset J is smaller than a predetermined value, the ninth risk adjustment gain can be set to a value that is no less than 1, and when the offset amount J is larger than a predetermined value, the ninth risk adjustment gain can be set to a value between 0 to 1.

Whereas, similar to the sixth risk gain in FIG. 26, the tenth risk adjustment gain is calculated to become smaller in proportion to the smallness of the offset amount J, and larger in proportion to the largeness of the offset amount J. For example, when the offset amount J is smaller than a predetermined value, the tenth risk adjustment gain can be set to a value between 0~1, and when the offset amount J is larger than a predetermined value, the tenth risk adjustment gain can be set to a value that is no less than 1.

Next, the operation procedure in the vehicle control device 100 in the present embodiment will be briefly described.

In the same manner as a second embodiment, the operation procedure in the vehicle control device 100 in the present embodiment is provided with a risk adjustment step S6 carried out by the second risk adjustment unit P405, between the risk adjustment step (step S5) carried out by the first risk adjustment unit P403, and the priority determination step (step S7) carried out by the priority control determination unit P404. This illustration is not included in the flowchart.

As above described, in step S6, the smaller the offset amount J, the larger the first risk is adjusted to be, and the smaller the second risk is adjusted to be; and the larger the offset amount J the smaller the first risk is adjusted to be and the larger the second risk is adjusted to be.

In the above manner, in the present embodiment, the closer the vehicle comes to the nearby obstacle, the more likely a warning or vehicle control will be executed based on the first risk, and the further away the vehicle is from the nearby obstacle, the more likely a warning or vehicle control will be executed based on the second risk. In the present embodiment, "the more likely a warning or vehicle control will be executed" includes expediting the timing for executing a warning or vehicle control.

Hereby, for example, if the vehicle is moving toward a nearby object while parking and so forth, it is possible to suppress unreasonable and inappropriate warning or vehicle control where the warning or vehicle control is executed for a remote object for which the possibility of contact is small. Therefore, it is possible to further reduce the amount of stress put on the driver. Moreover, in the present embodiment "to suppress the warning or vehicle control" includes delaying the timing for the warning or vehicle control.

Additionally, in the present embodiment, the first risk adjustment unit adjusts a first and second risk, to reduce the priority level for the warning or vehicle control with respect to an obstacle having a small possibility of contacting the vehicle while increasing the priority level of the warning and vehicle control with respect to an obstacle having a large possibility of contacting the vehicle, therefore it is possible to reduce the amount of stress put on the driver.

Furthermore, in the present embodiment, when the entrance of an obstacle is detected, a warning or vehicle control is preferentially executed with respect to the entering object, and can thereby cause the driver to reliably recognize the entered obstacle.

Additionally in the present embodiment, whether or not to execute a warning or vehicle control is determined based on a risk indicative of the possibility that the vehicle and the obstacle will come into contact, and can thereby allow execution of an appropriate warning or vehicle control.

Further, in the present embodiment, the vehicle is controlled in the order of a warning by the alarm device, deceleration by the driving force generator (deceleration by reducing the accelerator position), generation of reaction force on the accelerator pedal by the accelerator pedal reaction force generator, and deceleration by the brake force generator (deceleration by increasing the braking pressure), and therefore it is possible to suppress the stress associated with sudden vehicle control from being put on the driver.

In the present embodiment, although both the first and second risks were subject to risk adjustment based on the offset amount, either of only one of the first risk and second risk may be subject to risk adjustment.

It is possible to obtain the above described effects even with this manner of configuration.

The nearby obstacle 18 in the first to fifth embodiments is one example of a first obstacle; the remote obstacle 19 in the first to fifth embodiments is one example of a second obstacle in the present invention; the nearby obstacle detection device 11 and the periphery information acquisition unit P2 in the first to fifth embodiments are one example of a first obstacle detection means in the present invention; the remote obstacle detection device 12 and the periphery information acquisition unit P2 in the first to fifth embodiments are one example of a second obstacle detection means in the present invention; the first risk computing unit P401 and the second risk computing unit P402 in the first to fifth embodiments are one example of a risk calculation means in the present invention; the brake control actuation determination unit P5, the accelerator pedal actuation reaction force determination unit P7, the alarm determination unit P9 and the driving force control determination unit P11 in the first to fifth embodiments are one example of a risk determination means in the present invention; the driving force generator 13, the brake force generator 14, the accelerator pedal reaction force generator 15, and the alarm device 16 in the first to fifth embodiments are one example of a warning control means in the present invention; the parking lot D in the first embodiment and the planned parking place G in the fifth embodiment are one example of a planned parking place in the present invention; the parking lot D is one embodiment of a parking place in the present invention; the parking state determination unit P109 in the first to fifth embodiments is one example of parking state determination means in the present invention; the first risk adjustment unit P403 in the first to fifth embodiments is one example of a first risk adjustment means in the present invention; the position and attitude detection unit P110 in the second to fifth embodiments is one example of a position and attitude detection means in the present invention; the second risk adjustment unit P405 in the second to fifth embodiments are one example of the second risk adjustment means in the present invention.

Finally, the above description of the embodiments are provided merely to facilitate an understanding of the present invention, and is in no way for limiting the present invention. Accordingly, the various elements disclosed among the embodiments may be modified or substituted with equivalent elements insofar as the modifications and the like remain within the scope of the invention.

The invention claimed is:

1. A vehicle warning device comprising:
   a first obstacle detection device configured to detect a first obstacle in a first direction located within a nearby detection region near a host vehicle equipped with the vehicle warning device;
   a second obstacle detection device configured to detect a second obstacle in the first direction located further than the nearby detection region; and
   an electronic control unit programmed to:
      calculate a first risk, the first risk being a value indicative of a possibility that the host vehicle will come into contact with the first obstacle,
      calculate a second risk, the second risk being a value indicative of a possibility that the host vehicle will come into contact with the second obstacle,
      determine whether the host vehicle is in an entry state of entering a planned parking place, and increase the first risk and reduce the second risk upon determining that the host vehicle is in the entry state,
      determine whether the host vehicle is in an exit state of exiting a parking place, and reduce the first risk and increase the second risk upon determining that the host vehicle is in the exit state,
      determine whether to execute at least one of a warning to a driver of the host vehicle and execute vehicle control of the host vehicle, the determining whether to execute the warning to a driver of the host vehicle being based on a result of increasing or decreasing the first risk and increasing or decreasing the second risk upon determining that the host vehicle is in the entry state or the exit state, execute the warning upon determining that the warning should be executed, the determining whether to execute vehicle control of the host vehicle being based on the result of increasing or decreasing the first risk and increasing or decreasing the second risk upon determining that the host vehicle is in the entry state or the exit state, and execute vehicle control upon determining that the vehicle control should be executed, the first and second obstacle detection devices each configured to be provided on the host vehicle and operatively connected to the electronic control unit to output a detection value to the electronic control unit.

2. The vehicle warning device according to claim 1, wherein
the electronic control unit is further programmed to:
detect the position or the attitude of the host vehicle in relation to the first obstacle, and
adjust at least one of the first and the second risks based on the detected position or the attitude of the host vehicle.

3. The vehicle warning device according to claim 2, wherein
the electronic control unit is further programmed to:
detect a traveling direction of the host vehicle,
carry out at least one of an adjustment that increases the first risk and an adjustment that reduces the second risk as the traveling direction of the host vehicle becomes more oriented in a direction towards the first obstacle, and
carry out at least one of an adjustment that decreases the first risk and an adjustment that increases the second risk as the traveling direction of the host vehicle becomes more oriented in a direction away from the first obstacle.

4. The vehicle warning device according to claim 2, wherein
the electronic control unit is further programmed to:
detect a distance from the host vehicle to the first obstacle,
carry out at least one of an adjustment that increases the first risk and an adjustment that decreases the second risk as the distance from the host vehicle to the first obstacle becomes shorter, and
carry out at least one of an adjustment that decreases the first risk and an adjustment that increases the second risk as the distance from the host vehicle to the first obstacle becomes longer.

5. The vehicle warning device according to claim 2, wherein
the electronic control unit is further programmed to:
estimate a travel path for the host vehicle,
calculate a distance between the travel path and the first obstacle,
carry out at least one of an adjustment that increases the first risk and an adjustment that decreases the second risk as the distance between the travel path and the first obstacle becomes shorter, and
carry out at least one of an adjustment that decreases the first risk and an adjustment that increases the second risk as the distance between the travel path and the first obstacle becomes longer.

6. The vehicle warning device according to claim 2, wherein
the electronic control unit is further programmed to:
calculate an offset amount of the distance between an end on the host vehicle farthest from the planned parking place and the planned parking place,
carry out at least one of an adjustment that increases the first risk and an adjustment that decreases the second risk as the offset amount becomes smaller, and
carry out at least one of an adjustment that decreases the first risk and an adjustment that increases the second risk as the offset amount becomes larger.

7. The vehicle warning device according to claim 1, wherein
the first obstacle detection device is configured to detect entry of a third obstacle different from the first obstacle that enters between the host vehicle and the first obstacle; and
the electronic control unit is further programmed to execute at least one of the warning or the vehicle control with respect to the entry of the third obstacle versus the warning or vehicle control based on the first risk or the second risk.

8. The vehicle warning device according to claim 1, further comprising
an alarm device configured to provide the warning to the driver of the host vehicle upon determining that the warning should be executed.

9. A vehicle warning device comprising:
an obstacle detection device that detects a remote obstacle located further from a nearby region near a vehicle; and
an electronic control unit programmed to:
calculate a risk, the risk being a value indicative of a possibility that the host vehicle will come into contact with the remote obstacle,
determine whether the host vehicle is in an entry state of entering a planned parking place, and reduce the risk upon determining that the host vehicle is in the entry state,
determine whether the host vehicle is in an exit state of exiting the parking place, and increase the risk upon determining that the host vehicle is in the exit state,
determine whether to execute at least one of a warning to a driver of the host vehicle and execute vehicle control of the host vehicle, the determining whether to execute the warning to a driver of the host vehicle being based on a result of increasing or decreasing the first risk and increasing or decreasing the second risk upon determining that the host vehicle is in the entry state or the exit state, execute the warning upon determining that the warning should be executed, the determining whether to execute vehicle control of the host vehicle being based on the result of increasing or decreasing the first risk and increasing or decreasing the second risk upon determining that the host vehicle is in the entry state or the exit state, and execute vehicle control upon determining that the vehicle control should be executed,
the obstacle detection device configured to be provided on the host vehicle and operatively connected to the electronic control unit to output a detection value to the electronic control unit.

10. A vehicle warning device comprising:
a first obstacle detection device configured to detect a first obstacle in a first direction located within a nearby detection region near a host vehicle equipped with the vehicle warning device;
a second obstacle detection device configured to detect a second obstacle in the first direction located further than the nearby detection region; and
an electronic control unit programmed to:
calculate a first risk, the first risk being a value indicative of a possibility that the host vehicle will come into contact with the first obstacle,
calculate a second risk, the second risk being a value indicative of a possibility that the host vehicle will come into contact with the second obstacle,
determine whether the host vehicle is in an entry state of entering a planned parking place, and increase the first risk and reduce the second risk upon determining that the host vehicle is in the entry state, determine whether the host vehicle is in an exit state of exiting a parking place, and reduce the first risk and increase the second risk upon determining that the host vehicle is in the exit state, determine whether to execute a warning to a driver of the host vehicle based on a result of increasing or decreasing the first risk and increasing or decreasing the second risk upon determining that the host vehicle is in the entry state or the exit state, and execute the warning upon determining that the warning should be executed, and determine whether to execute vehicle control of the host vehicle based on the result of increasing or decreasing the first risk and increasing or decreasing the second risk upon determining that the host vehicle is in the entry state or the exit state, and execute vehicle control upon determining that the execute vehicle control should be executed, the first and second obstacle detection devices each configured to be provided on the host vehicle and operatively connected to the electronic control unit to output a detection value to the electronic control unit.

11. A vehicle warning device comprising:

a first obstacle detection device configured to detect a first obstacle in a first direction located within a nearby detection region near a host vehicle equipped with the vehicle warning device;

a second obstacle detection device configured to detect a second obstacle in the first direction located further than the nearby detection region; and an electronic control unit programmed to:
  calculate a first risk, the first risk being a value indicative of a possibility that the host vehicle will come into contact with the first obstacle,
  calculate a second risk, the second risk being a value indicative of a possibility that the host vehicle will come into contact with the second obstacle,
  determine whether the host vehicle is in an entry state of entering a planned parking place, and increase the first risk and reduce the second risk upon determining that the host vehicle is in the entry state,
  determine whether the host vehicle is in an exit state of exiting a parking place, and reduce the first risk and increase the second risk upon determining that the host vehicle is in the exit state,
  determine whether to execute at least one of a warning to a driver of the host vehicle and execute vehicle control of the host vehicle, the determining whether to execute the warning to a driver of the host vehicle being based on the first and second risks, execute the warning upon determining that the warning should be executed, the determining whether to execute vehicle control of the host vehicle being based on the first and second risks, and execute vehicle control upon determining that the vehicle control should be executed,
  detect the position or the attitude of the host vehicle in relation to the first obstacle,
  adjust at least one of the first and the second risks based on the detected position or the attitude of the host vehicle,
  calculate an offset amount of the distance between an end on the host vehicle farthest from the planned parking place and the planned parking place,
  carry out at least one of an adjustment that increases the first risk and an adjustment that decreases the second risk as the offset amount becomes smaller, and
  carry out at least one of an adjustment that decreases the first risk and an adjustment that increases the second risk as the offset amount becomes larger, the first and second obstacle detection devices each configured to be provided on the host vehicle and operatively connected to the electronic control unit to output a detection value to the electronic control unit.

* * * * *